(12) United States Patent
Higuchi et al.

(10) Patent No.: US 8,451,388 B2
(45) Date of Patent: May 28, 2013

(54) AUDIO PROCESSING APPARATUS AND AUDIO PROCESSING METHOD FOR PROCESSING ACCORDING TO DETECTED MODE

(75) Inventors: Satoshi Higuchi, Kanagawa (JP); Takayuki Niitsuma, Chiba (JP); Keisuke Satou, Kanagawa (JP); Junichiro Matsumoto, Tokyo (JP); Hiromichi Fujita, Tokyo (JP)

(73) Assignee: Sony Corporation (JP)

( * ) Notice: Subject to any disclaimer, the term of this patent is extended or adjusted under 35 U.S.C. 154(b) by 379 days.

(21) Appl. No.: 12/798,960

(22) Filed: Apr. 14, 2010

(65) Prior Publication Data
US 2010/0271560 A1    Oct. 28, 2010

(30) Foreign Application Priority Data

Apr. 22, 2009  (JP) ............... P2009-104343

(51) Int. Cl.
  *H04N 5/60* (2006.01)
  *H04N 5/268* (2006.01)
  *H02B 1/00* (2006.01)
(52) U.S. Cl.
  USPC ............... 348/738; 348/706; 381/123
(58) Field of Classification Search
  USPC .......... 348/738, 553; 381/300, 301, 303–306, 381/56, 58, 96, 104; 725/14, 20
  See application file for complete search history.

(56) References Cited

U.S. PATENT DOCUMENTS

| | | | | |
|---|---|---|---|---|
| 4,933,768 A * | 6/1990 | Ishikawa et al. | ............... | 348/738 |
| 5,197,100 A * | 3/1993 | Shiraki | ............... | 381/27 |
| 5,548,346 A * | 8/1996 | Mimura et al. | ............... | 348/738 |
| 5,815,219 A * | 9/1998 | Okuizumi | ............... | 348/725 |
| 6,067,126 A * | 5/2000 | Alexander | ............... | 348/738 |
| 6,188,439 B1 * | 2/2001 | Kim | ............... | 348/553 |
| 6,909,471 B2 * | 6/2005 | Bayley | ............... | 348/738 |
| 7,053,924 B2 * | 5/2006 | Ohkawa et al. | ............... | 348/14.08 |
| 7,327,402 B2 * | 2/2008 | Kim | ............... | 348/555 |
| 7,961,258 B2 * | 6/2011 | Lee et al. | ............... | 348/738 |

(Continued)

FOREIGN PATENT DOCUMENTS

| | | |
|---|---|---|
| CN | 1203493 A | 12/1998 |
| CN | 101395902 A | 3/2009 |

(Continued)

OTHER PUBLICATIONS

High-Definition Multimedia Interface Specification Version 1.3a, Nov. 10, 2006, pp. ii-156 and Supplement 1 Consumer Electronics Control (CEC), pp. ii-97.

*Primary Examiner* — Victor Kostak
(74) *Attorney, Agent, or Firm* — Lerner, David, Littenberg, Krumholz & Mentlik, LLP

(57) ABSTRACT

An audio processing apparatus includes: a transmission signal input/output unit that inputs or outputs a video signal, an audio signal, and a control signal; a reproduction processing unit that reproduces the audio signal inputted to the transmission signal input/output unit or an audio signal inputted to any other audio signal input unit; an output unit that outputs the audio signal, which is processed by the reproduction processing unit, through a loudspeaker; and a control unit that when detecting that a control signal signifying that a predetermined mode concerning the display image quality represented by the video signal should be designated is inputted to the transmission signal input/output unit, instructs the reproduction processing unit to perform predetermined sound-field processing or sound-quality processing during the reproduction.

6 Claims, 17 Drawing Sheets

U.S. PATENT DOCUMENTS

| | | | |
|---|---|---|---|
| 7,970,155 B2* | 6/2011 | Asayama et al. | 381/123 |
| 2002/0067436 A1* | 6/2002 | Shirahama et al. | 348/725 |
| 2002/0078447 A1* | 6/2002 | Mizutome et al. | 725/37 |
| 2003/0007001 A1* | 1/2003 | Zimmerman | 345/716 |
| 2005/0091680 A1* | 4/2005 | Kondo | 725/12 |

FOREIGN PATENT DOCUMENTS

| | | |
|---|---|---|
| JP | 11027605 A | 1/1999 |
| JP | 2004-032000 A | 1/2004 |
| JP | 2008-035399 A | 2/2008 |

\* cited by examiner

FIG.2

LOGICAL ADDRESS

| ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED (AS INITIATOR ADDRESS) BROADCAST (AS DESTINATION ADDRESS) |

FIG.3

| GENRE | SOUND FIELD |
|---|---|
| NEWS/PRESS REPORT | NEWS |
| SPORTS | SPORTS |
| INFORMATION/TALK SHOW | STANDARD |
| DRAMA | STANDARD |
| MUSIC | MUSIC |
| VARIETY SHOW | STANDARD |
| MOVIE | MOVIE |
| ANIMATION/SPECIAL-EFFECTS MOVIE | STANDARD |
| DOCUMENTARY | STANDARD |
| STAGE/PUBLIC PERFORMANCE | MUSIC |
| HOBBY/EDUCATION | NEWS |
| WELFARE | NEWS |
| MISCELLANEOUS | STANDARD |
| SPORTS(CS) | SPORTS |
| FOREIGN MOVIE(CS) | MOVIE |
| JAPANESE MOVIE(CS) | MOVIE |
| NO INFORMATION (※) | STANDARD OR RETAINING PREVIOUS S.F. VALUE |

FIG.4

| SOUND FIELD | FEATURE |
|---|---|
| STANDARD | Sounds are not especially processed. |
| MOVIE | An effect suitable for viewing of a movie is exerted. |
| NEWS | Appropriate equalization is performed on sounds, which are routed to all the channels, in order to improve the clearness of announcement. |
| SPORTS | The surround sound mode is forcibly designated, and appropriate equalization is performed on sound, which is routed to the center channel, in order to improve the clearness of commentary given during a sports program. |
| GAME | An effect suitable for playing of a home game machine is exerted. |
| MUSIC | Wideband amplification is performed during two-channel stereophony. |
| JAZZ | Music-relating effect (JAZZ) |
| CLASSIC | Music-relating effect (CLASSIC) |
| ROCK | Music-relating effect (ROCK) |
| POP | Music-relating effect (POP) |
| DANCE | Music-relating effect (DANCE) |
| FLAT | Two-channel stereophony |

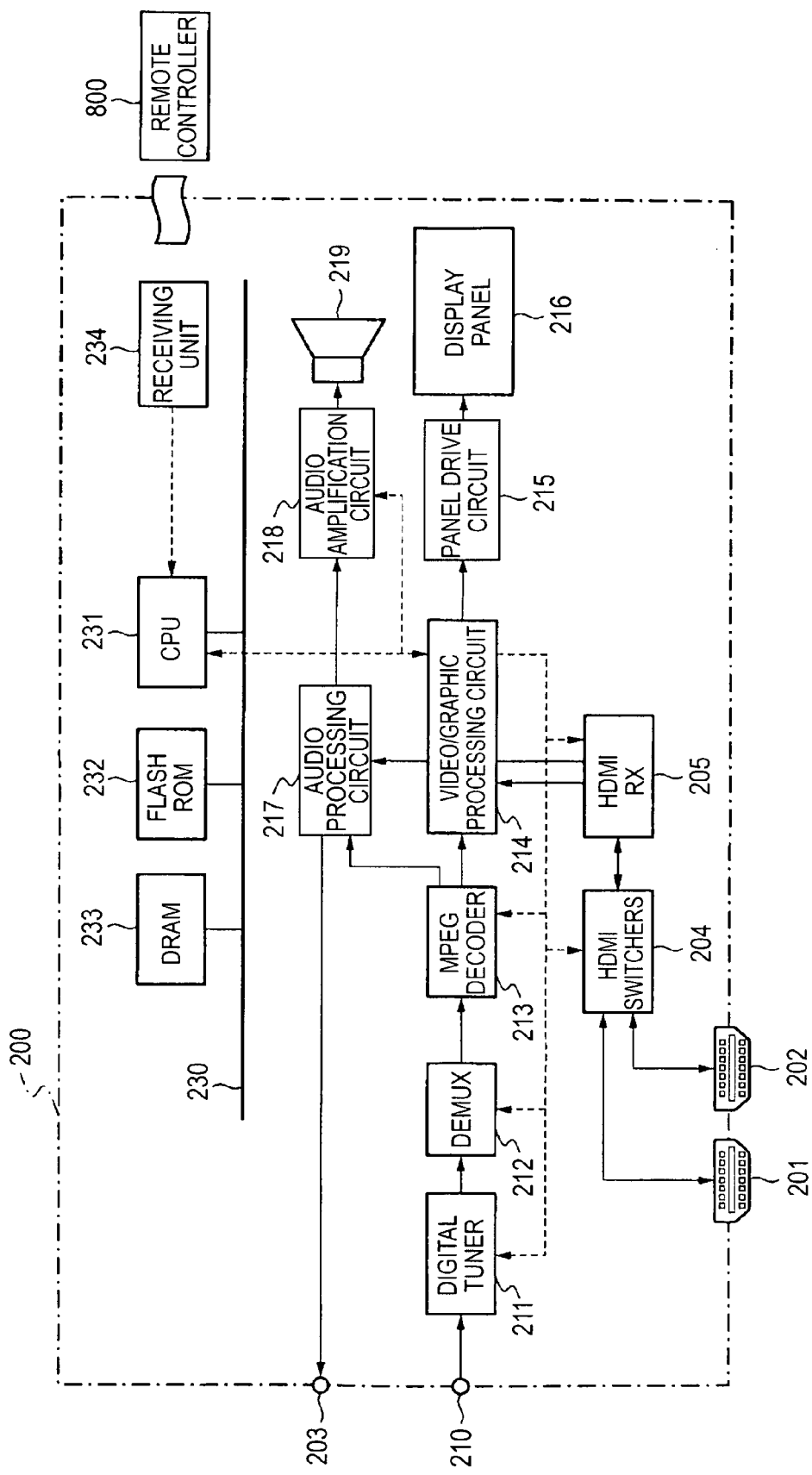

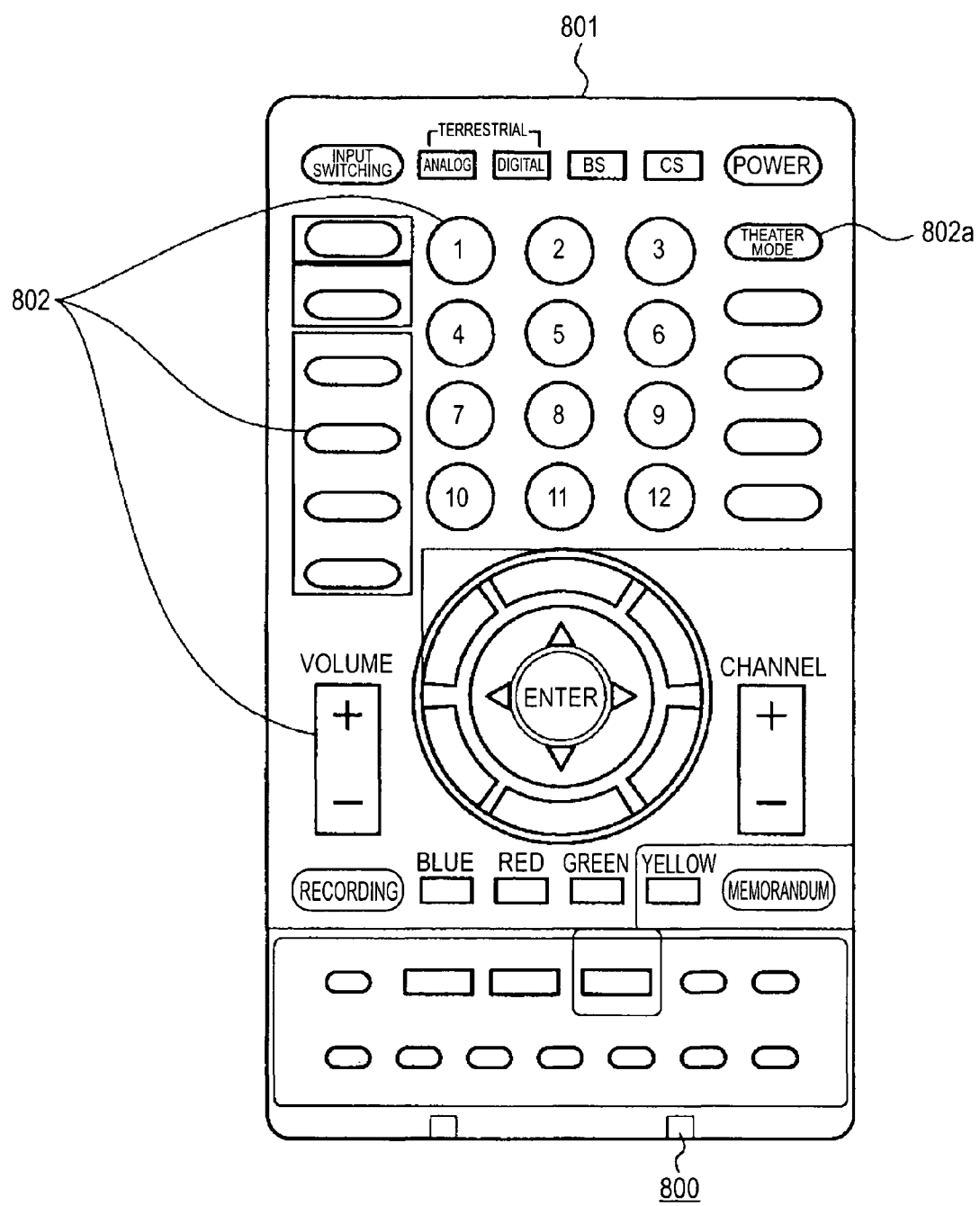

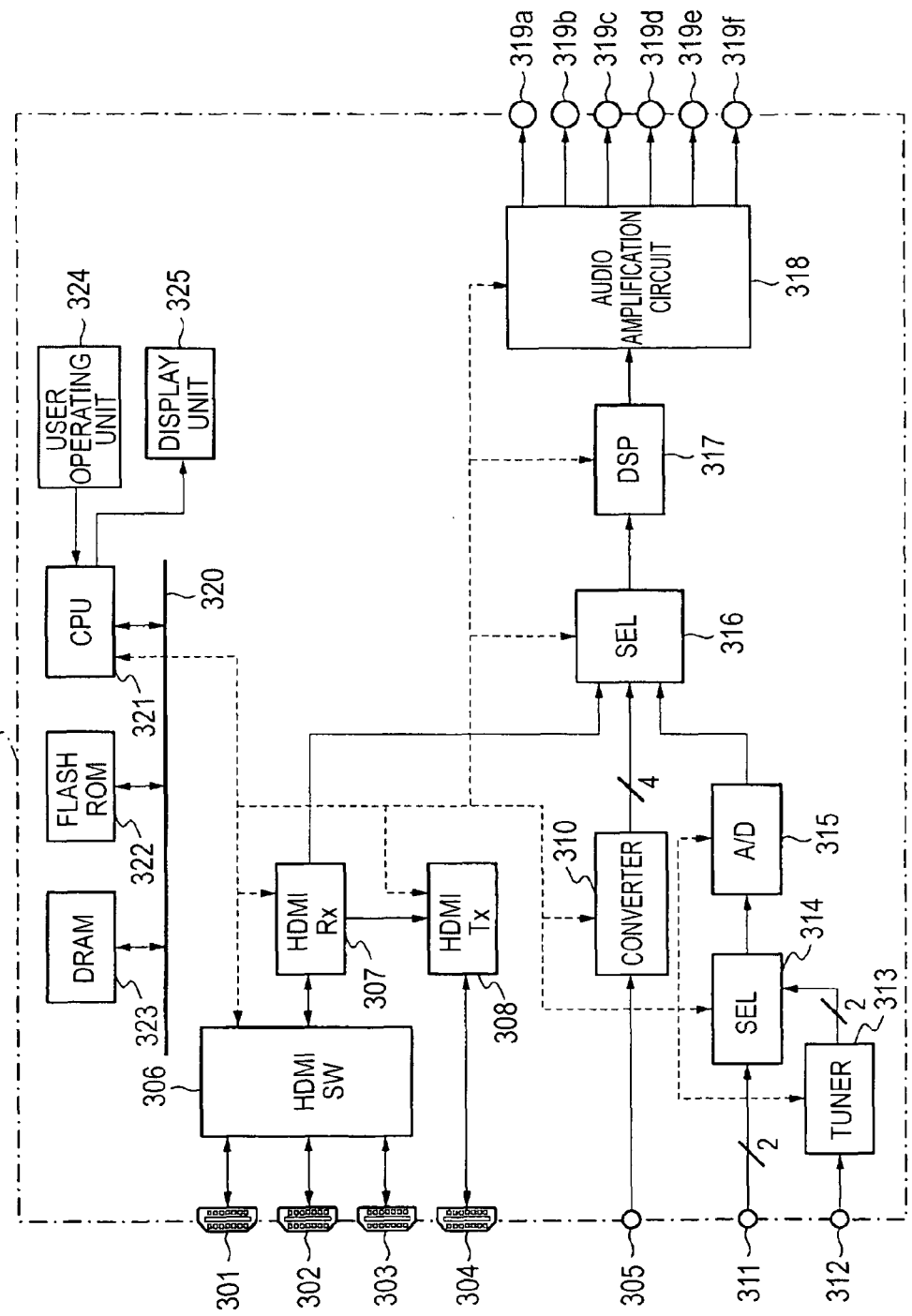

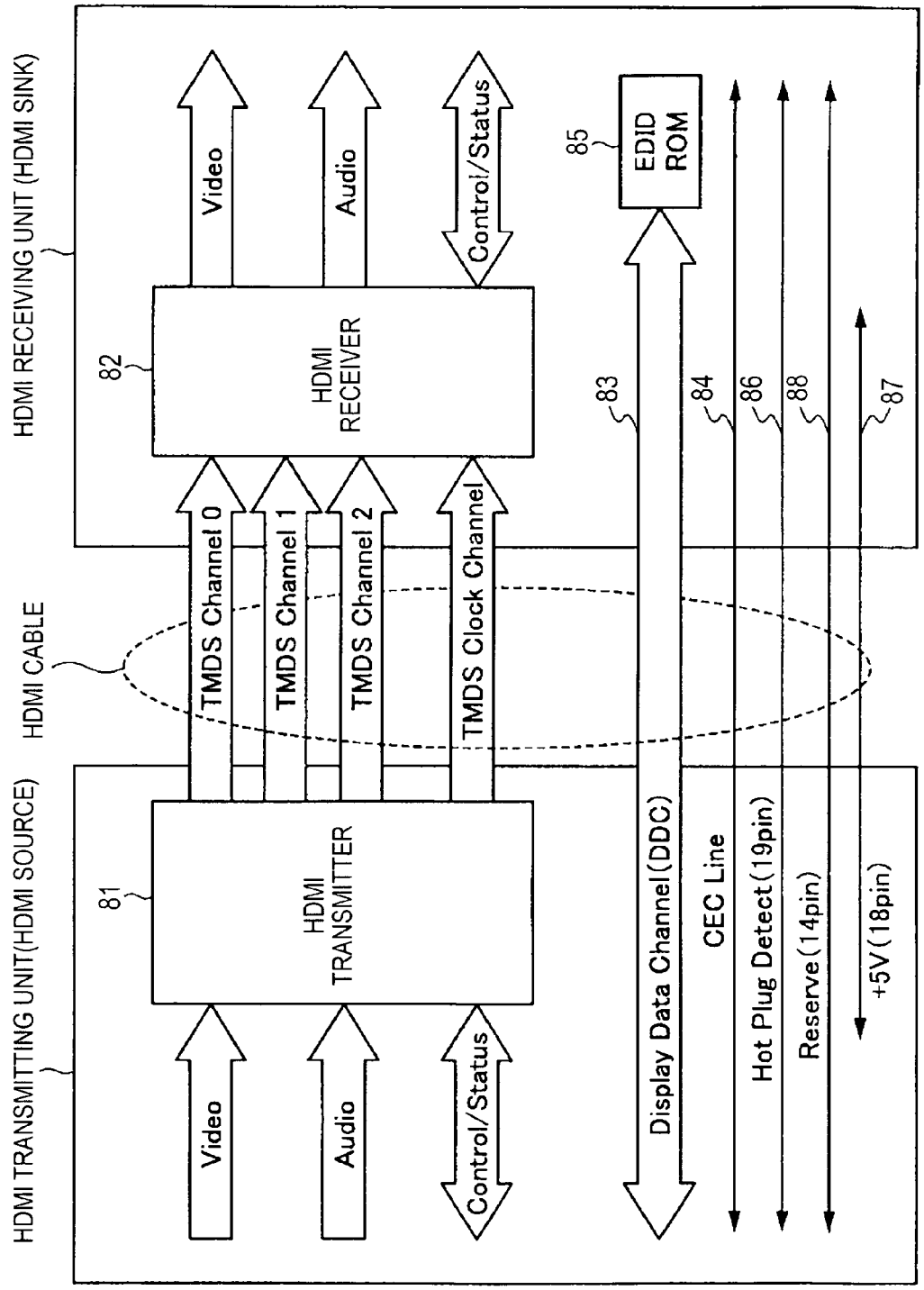

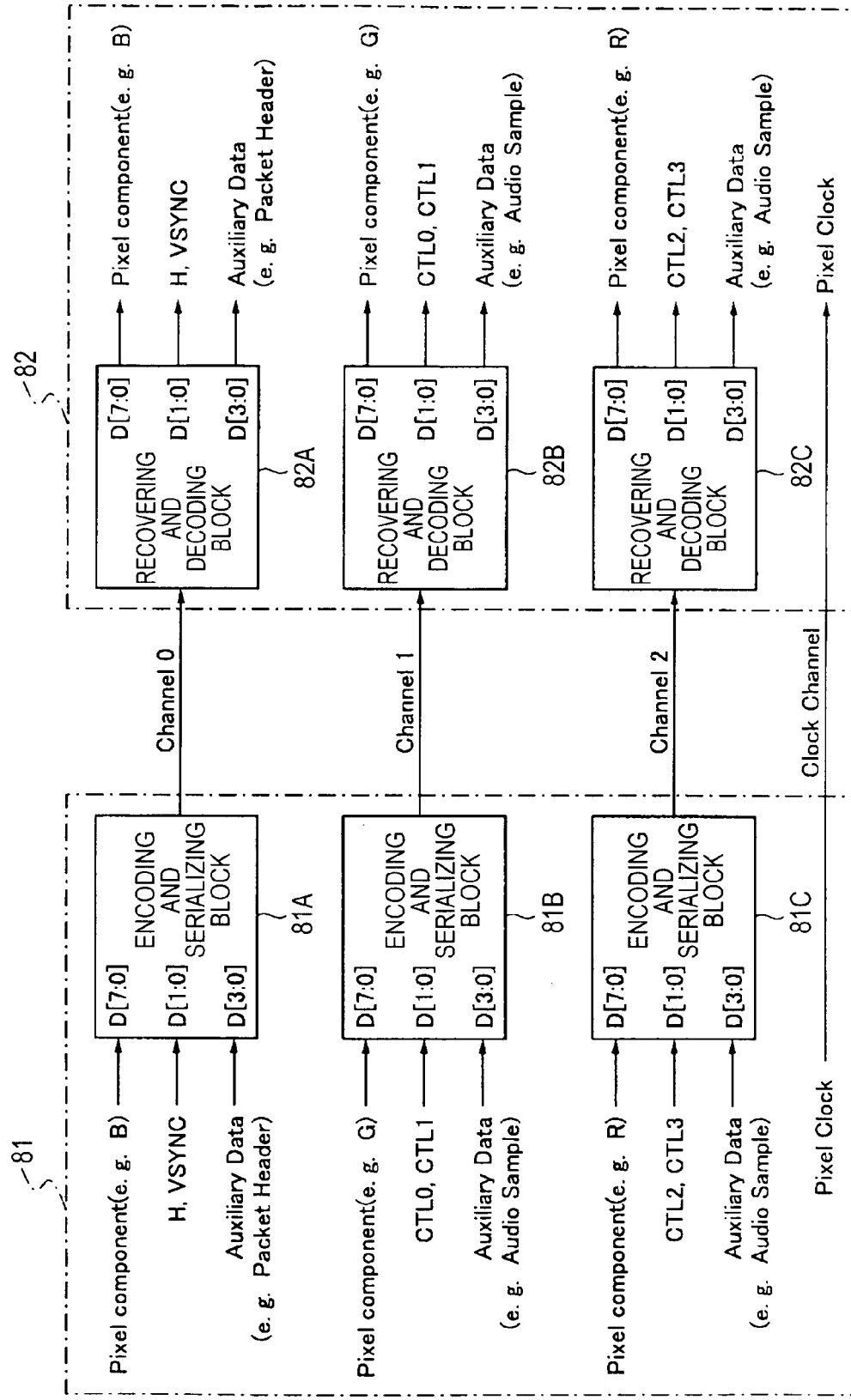

TMDS TRANSMISSION DATA STRUCTURE

CEC DATA STRUCTURE

HEADER DATA STRUCTURE

EXAMPLE OF ACTIONS TO BE PERFORMED IN CASE WHERE SYSTEM AUDIO CONTROL IS VALIDATED IN AV AMPLIFIER (TV LOUDSPEAKER IS CHANGED TO LOUDSPEAKERS CONNECTED TO AV AMPLIFIER)

EXAMPLE OF ACTIONS TO BE PERFORMED IN CASE WHERE CEC MODE IS DESIGNATED

STATE TRANSITION DIAGRAM

AUDIO PROCESSING APPARATUS AND AUDIO PROCESSING METHOD FOR PROCESSING ACCORDING TO DETECTED MODE

CROSS-REFERENCE TO RELATED APPLICATION

The present application claims priority from Japanese Patent Application No. JP 2009-104343 filed in the Japanese Patent Office on Apr. 22, 2009, the entire content of which is incorporated herein by reference.

BACKGROUND OF THE INVENTION

1. Field of the Invention

The present invention relates to an audio processing apparatus and an audio processing method which are preferably adapted to an audiovisual (AV) system. More particularly, the present invention is concerned with an audio processing technology preferably employed in a case where a system is constructed by connecting the audio processing apparatus to a television set or the like.

2. Description of the Related Art

The high-definition multimedia interface (HDMI) has prevailed as the specifications for transmission digital interfaces via which a video signal (image signal) and an audio signal are transmitted. The HDMI has been compiled by adding the specifications for an audio transmission facility and a copyright protection facility to the digital visual interface (DVI) specifications, which are the standard specifications for connection between a personal computer (PC) and a display, so that the specifications will apply to an audiovisual (AV) apparatus. In "High-definition Multimedia Interface Specification Version 1.3a" (Nov. 10, 2006) (non-patent document 1), the HDMI specifications are detailed.

Interfaces defined by the HDMI specifications can bi-directionally transmit a control signal. Therefore, for example, the control signal can be transmitted from a television set to an output apparatus such as a set-top box (STB) or a video disk player over an HDMI cable. Accordingly, an entire audiovisual system can be operated using a remote controller of the television set. Signals to be transmitted over a transmission cable defined by the HDMI specifications include control commands, which are used to a control apparatus, responses to the commands, and signals indicating the states of the apparatus. In this specification, the signals shall be generically called control signals.

The HDMI specifications support inter-apparatus control to be implemented using a consumer electronics control (CEC) facility. The CEC facility is one of transmission lines which are defined by the HDMI specifications and over which data is bi-directionally transmitted. The employment of the CEC line permits various controls to be implemented based on a physical address and a logical address inherently assigned to each of apparatuses interconnected on an HDMI network. For example, when a user is viewing a digital broadcast on a television set, if the user starts a video disk player connected over an HDMI cable, the television set autonomously selects an input terminal via which the video disk player is connected. In addition, the remote controller of the television set may be used to manipulate menu items displayed by the video disk player or turn on or off the power supply of the video disk player.

The HDMI specifications stipulate that up to ten apparatuses including a television set can be interconnected. This means that up to nine external apparatuses can be connected to one television set. When nine external apparatuses are connected to the television set, the remote controller can be used to operate any of the apparatuses.

The HDMI specifications define a message Active Source as a CEC message that explicitly indicates an apparatus whose image is displayed on a television set. According to the specifications, for example, when a user manipulates a reproduction button of a video disk player compatible with the HDMI specifications, the video disk player outputs an audiovisual stream as long as it can output a stable video signal (that is, when it is active). In addition, the video disk player broadcasts the message Active Source signifying that the video disk player is an active apparatus.

Now, "broadcasting" means that a signal is distributed to all apparatuses, which are transmission destinations, instead of being transmitted to any specific apparatus. The television set and other external apparatuses to which the message Active Source is broadcasted switch paths so as to reproduce an audiovisual stream to be outputted from the video disk player.

As mentioned above, the HDMI specifications stipulate that an apparatus which begins displaying a picture on the television set broadcasts the message Active Source to the other apparatuses on the network. The message Active Source is one of CEC messages defined by the HDMI specifications.

As described in JP-A-2008-35399 (patent document 1), a mode in which a reproductive sound field is changed from one to another according to genre information specified in an electronic program guide (EPG) received by a television set is realized as a CEC mode supported by the HDMI. In the mode, at the beginning of receiving a broadcast to be viewed on the television set, or when broadcasts are changed, the genre information specified in the EPG is transferred over a HDMI-CEC line. When an audio reproduction apparatus that may be called an audiovisual amplifier receives the genre information over the CEC line, the audio reproduction apparatus designates a reproductive sound field according to the genre information.

For example, when a sport program is viewed, a reproduction mode in which a sense of activity provided by the sport program is felt is designated. When a news program is viewed, a reproduction mode in which voice (speech) is readily heard is designated.

SUMMARY OF THE INVENTION

As mentioned above, when a television set and an audio reproduction apparatus such as an audiovisual amplifier are connected to each other over a cable defined by the HDMI specifications, a reproductive sound field can be designated according to a genre of an audiovisual content to be viewed.

However, when a mode or a sound field is automatically designated according to a content being viewed, the designated sound field may not reflect the intention of a user who is viewing the content. Specifically, when the user wants to view an audiovisual content with a specific sound field designated using an audiovisual amplifier, the user has to display a manipulation window supported by the audiovisual amplifier and has to perform a manipulation to designate a desired sound field. Otherwise, a remote controller dedicated to the audiovisual amplifier is prepared, and keys on the remote controller are manipulated in order to select a reproduction mode for reproducing a sound field. The manual designation is time-consuming and labor-intensive and is not said to be preferable.

Genre information may not be obtained in relation to all audiovisual contents to be viewed on a television set. There is a high possibility that designation to be achieved based on the genre information may not be appropriate.

Thus, it is desirable to readily and appropriately designate a reproductive state or a sound field for an audio processing apparatus such as an audiovisual amplifier while allowing the audio processing apparatus to collaborate with other apparatus.

According to an embodiment of the present invention, there is provided an apparatus including an input/output unit that inputs or outputs a video signal, an audio signal, and a control signal, and performs input processing and output processing on the video signal and audio signal. The apparatus reproduces the audio signal inputted to the input/output unit, and outputs sounds, which are represented by the processed audio signal, through a loudspeaker. When the fact that the input/output unit has inputted a control signal signifying that a predetermined mode concerning the display image quality represented by the video signal should be designated is detected, predetermined sound-field or sound-quality processing is performed during the reproduction.

Accordingly, once the control signal signifying that the predetermined mode concerning the display image quality of a picture should be designated is transmitted from an external apparatus to the apparatus, the apparatus performs the predetermined sound-field or sound-quality processing.

According to the embodiment of the present invention, once the predetermined mode concerning the display image quality of a picture is designated at an external apparatus, the predetermined sound-field or sound-quality processing is automatically carried out. A sound field or sound quality can be readily designated by allowing plural apparatuses to collaborate with each other with a user's manipulation.

BRIEF DESCRIPTION OF THE DRAWINGS

FIG. 2 is a diagram showing a CEC table that presents the relationship of association between apparatuses and CEC logical addresses;

FIG. 3 is a diagram showing an example of the relationship of association between genres and sound fields;

FIG. 4 is a diagram showing the features or characteristics of sound fields provided by an audiovisual amplifier;

FIG. 5 is a block diagram showing an example of the configuration of a television set (sink) included in the audiovisual system to which the present invention is adapted;

FIG. 6 is a plan view showing an example of the configuration of a remote controller for the television set to which the embodiment of the present invention is connected;

FIG. 7 is a block diagram showing an example of the configuration of an audiovisual amplifier (repeater) included in the audiovisual system to which the present invention is adapted;

FIG. 8 is a block diagram showing an example of the configurations of an HDMI transmitting unit (HDMI source) and an HDMI receiving unit (HDMI sink);

FIG. 9 is a block diagram showing an example of the configurations of an HDMI transmitter and an HDMI receiver;

DESCRIPTION OF THE PREFERRED EMBODIMENTS

Referring to the accompanying drawings, an embodiment of the present invention will be described below. The embodiment will be described by following subjects presented below.

1. Example of an overall system configuration (FIG. 1 to FIG. 4)

2. Example of the configuration of a television set (FIG. 5 and FIG. 6)

3. Example of the configuration of an audiovisual amplifier (FIG. 7)

4. Example of the transmission form conformable to the HDMI specifications, and example of processing (FIG. 8 to FIG. 12)

5. Examples of processing for designating a theater mode and processing for canceling the theater mode (FIG. 13 to FIG. 20)

1. Example of the Overall System Configuration (FIG. 1 and FIG. 2)

An example of an embodiment of the present invention will be described below.

Figure 1:
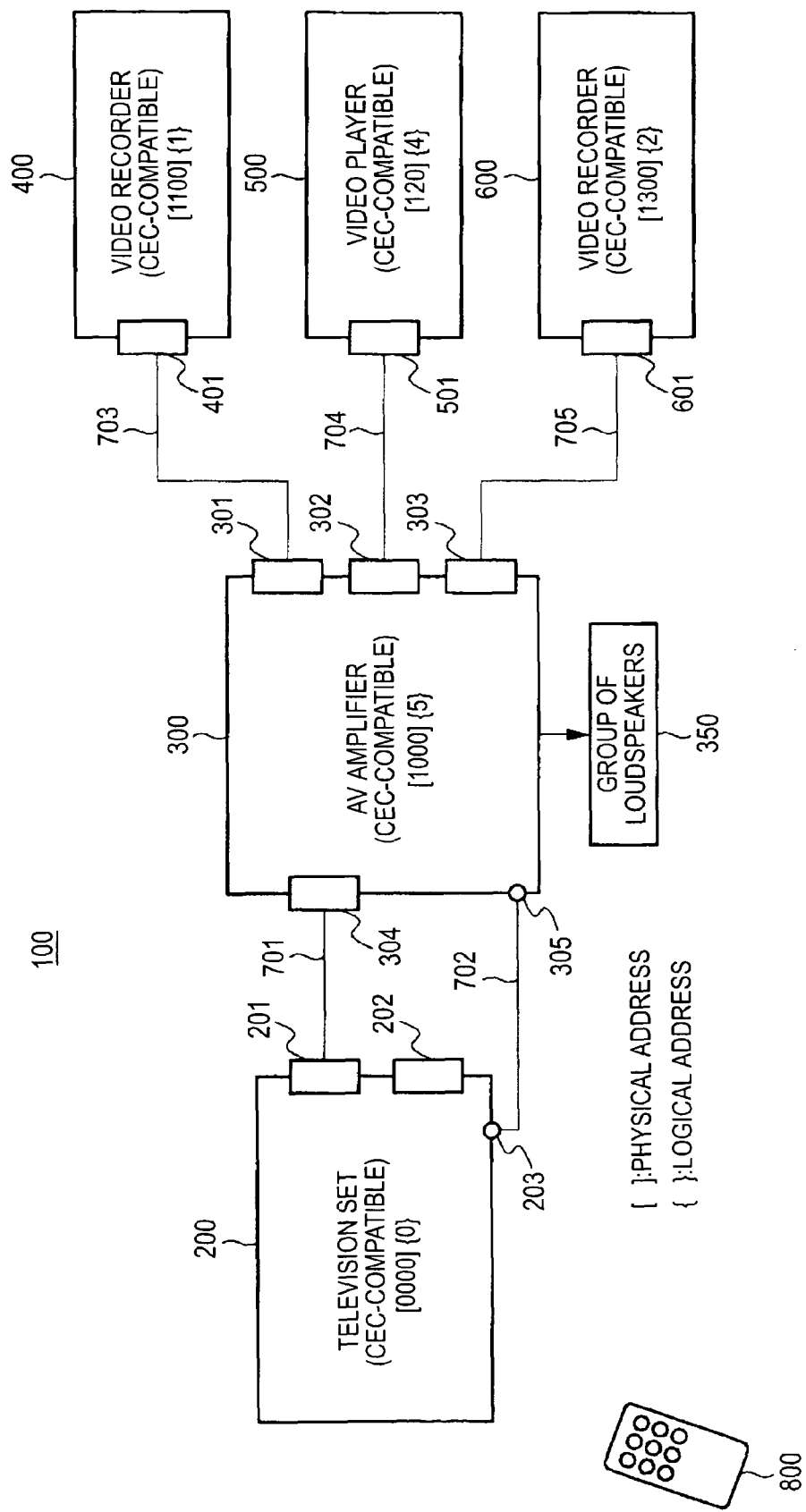
FIG. 1 is a block diagram showing an example of the configuration of an audiovisual system to which the present invention is adapted.

FIG. 1 shows an example of the configuration of an audiovisual system 100 to which an embodiment of the present invention is adapted.

The audiovisual system 100 includes a television set 200, an audiovisual amplifier 300, a video recorder 400, a video player 500, and a video recorder 600. The video recorder 400, video player 500, and video recorder 600 serve as HDMI-compatible sources. The audiovisual amplifier 300 serves as an HDMI-compatible repeater. The television set 200 serves as an HDMI-compatible sink. The video recorder 400, video player 500, and video recorder 600 are apparatuses that use a video disk such as a DVD or a hard disk as a recording medium to record or reproduce video data (audiovisual content).

The television set 200 is a CEC-compatible apparatus and includes HDMI terminals 201 and 202 and an optical output terminal 203. The television set 200 is designed to be remotely controllable by means of a remote controller 800. The video recorder 400 includes an HDMI terminal 401, the video player 500 includes an HDMI terminal 501, and the video recorder 600 includes an HDMI terminal 601. These apparatuses are compatible with the CEC control protocol.

The audiovisual amplifier 300 is a CEC-compatible apparatus, and includes HDMI terminals 301, 302, 303, and 304, and an optical input terminal 305. A group of loudspeakers 350 including plural loudspeakers is connected to the audiovisual amplifier 300. An audio signal subjected to reproducing processing by the audiovisual amplifier 300 is outputted through the group of loudspeakers 350. The group of loudspeakers 350 realizes a 5.1-channel surround sound environment. The group of loudspeakers 350 includes a loudspeaker located in front of a listener, a loudspeaker located on the front right side thereof, a loudspeaker located on the front left side thereof, a loudspeaker located on the rear right side thereof, a loudspeaker located on the rear left side thereof, and a bass outputting subwoofer loudspeaker. The audiovisual amplifier 300 and loudspeakers may be separated from each other. Otherwise, the audiovisual amplifier 300 and loudspeakers (at least the front loudspeaker) may be put in a rack on which the television set is placed.

The television set 200 and audiovisual amplifier 300 are connected to each other over an HDMI cable 701 and an optical cable 702. Specifically, one end of the HDMI cable 701 is coupled to the HDMI terminal 201 of the television set 200, and the other end thereof is coupled to the HDMI terminal 304 of the audiovisual amplifier 300. One end of the optical cable 702 is coupled to the optical output terminal 203 of the television set 200, and the other end thereof is coupled to the optical input terminal 305 of the audiovisual amplifier 300.

The audiovisual amplifier 300 and video recorder 400 are connected to each other over an HDMI cable 703. Specifically, one end of the HDMI cable 703 is coupled to the HDMI terminal 301 of the audiovisual amplifier 300, and the other end thereof is coupled to the HDMI terminal 401 of the video recorder 400.

The audiovisual amplifier 300 and video player 500 are connected to each other over an HDMI cable 704. Specifically, one end of the HDMI cable 704 is coupled to the HDMI terminal 302 of the audiovisual amplifier 300, and the other end thereof is coupled to the HDMI terminal 501 of the video player 500.

The audiovisual amplifier 300 and video recorder 600 are connected to each other over an HDMI cable 705. Specifically, one end of the HDMI cable 705 is coupled to the HDMI terminal 303 of the audiovisual amplifier 300, and the other end thereof is connected to the HDMI terminal 601 of the video recorder 600.

In the audiovisual system 100 shown in FIG. 1, a physical address of each of the apparatuses and a CEC logical address thereof are acquired, for example, as described below. Specifically, when the audiovisual amplifier 300 is connected to the television set 200 (whose physical address is [0000] and whose CEC logical address is {0}) over the HDMI cable 701, the audiovisual amplifier 300 uses an HDMI control protocol to acquire the physical address [1000] from the television set 200.

A CEC-compatible apparatus is stipulated to acquire a logical address when connected in conformity with the HDMI. The CEC-compatible apparatus uses the logical address to transmit or receive messages. FIG. 2 shows a table presenting the relationship of association between apparatuses and CEC logical addresses. "TV" in the Device column refers to a television set, a projector, or any other apparatus that displays a picture. "Recording Device" in the Device column refers to a hard disk recorder, a DVD recorder, or any other recording apparatus. "Tuner" in the Device column refers to an apparatus that receives an audiovisual content, such as, a set-top box (STB) that receives a cable television program. "Playback Device" in the Device column refers to a video player, a camcorder, or any other reproducing apparatus. "Audio System" in the Device column refers to an audiovisual amplifier, or any other audio processing apparatus.

The audiovisual amplifier 300 is, as mentioned above, a CEC-compatible apparatus. Based on the table shown in FIG. 2, the audiovisual amplifier 300 adopts an address {5} associated with Audio System as a logical address thereof. In this case, the audiovisual amplifier 300 transmits a polling message defined by the CEC control protocol so as to verify that no apparatus bears the logical address of {5}, and adopts the logical address of {5} as the own logical address. The audiovisual amplifier 300 transmits a message Report Physical Address, which is defined by the CEC control protocol, so as to notify the television set 200 of the fact that the physical address [1000] is assigned to the CEC-compatible apparatus bearing the logical address off {5}.

When the video recorder 400 is connected to the audiovisual amplifier 300 over the HDMI cable 703, the video recorder 400 uses the HDMI control protocol to acquire a physical address [1100] from the audiovisual amplifier 300.

The video recorder 400 is, as mentioned above, a CEC-compatible apparatus. Based on the table shown in FIG. 2, the video recorder 400 adopts an address {1} associated with Recording Device as a logical address thereof. In this case, after the video recorder 400 transmits a polling message, which is defined by the CEC control protocol, so as to verify that no apparatus bears the logical address {1}, the video recorder 400 adopts the logical address {1} as the own logical address. The video recorder 400 then transmits the message Report Physical Address, which is defined by the CEC control protocol, so as to notify the television set 200 and audiovisual amplifier 300 of the fact that the physical address [1100] is assigned to the CEC-compatible apparatus bearing the logical address {1}.

When the video player 500 is connected to the audiovisual amplifier 300 over the HDMI cable 704, the video player 500 uses the HDMI control protocol to acquire a physical address [1200] from the audiovisual amplifier 300.

The video player 500 is, as mentioned above, a CEC-compatible apparatus. Based on the table shown in FIG. 2, the video player 500 adopts an address {4} associated with Playback Device as a logical address thereof. In this case, after the video player 500 transmits the polling message, which is defined by the CEC control protocol, so as to verify that no apparatus bears the logical address {4}, the video player 500 adopts the logical address {4} as the own logical address. The video player 500 then transmits the message Report Physical Address, which is defined by the CEC control protocol, so as to notify the television set 200 and audiovisual amplifier 300 of the fact that the physical address [1200] is assigned to the CEC-compatible apparatus bearing the logical address {4}.

When the video recorder 600 is connected to the audiovisual amplifier 300 over the HDMI cable 705, the video recorder 600 uses the HDMI control protocol to acquire a physical address [1300] from the audiovisual amplifier 300.

The video recorder 600 is, as mentioned above, a CEC-compatible apparatus. Based on the table shown in FIG. 2, the video recorder 600 adopts an address {2} associated with Recording Device as a logical address thereof. In this case, after the video recorder 600 transmits the polling message, which is defined by the CEC control protocol, to the other apparatuses so as to verify that no apparatus bears the logical address {2}, the video recorder 600 adopts the logical address {2} as the own logical address. The video recorder 600 transmits the message Report Physical Address, which is defined by the CEC control protocol, so as to notify the television set 200 and audiovisual amplifier 300 of the fact that the physical address [1300] is assigned to the CEC-compatible apparatus bearing the logical address {2}.

In the audiovisual system 100 shown in FIG. 1, when a program whose channel is selected by a tuner of the television set 200 is viewed, actions described below are carried out. Specifically, an image represented by a video signal obtained by the tuner is displayed on a display panel (not shown) of the television set 200. When the audiovisual amplifier 300 is released from a system audio mode, audio (sounds) represented by an audio signal obtained by the tuner is outputted through a loudspeaker (not shown) of the television set 200. When the audiovisual amplifier 300 is set to the system audio mode, the audio represented by the audio signal obtained by the tuner is outputted through the group of loudspeakers 350 connected to the audiovisual amplifier 300.

The television set 200 supports a specific picture-and-sounds mode called a theater mode. When the theater mode is designated, display of a picture on the display panel is achieved in a picture display mode in which a gray scale or tones are optimized for display of a cinematic picture. In addition, audio outputting through the loudspeakers is achieved in a surround sound mode suitable for cinematic audio reproduction. The picture display mode in which a gray scale or tones are optimized for display of a cinematic picture is, for example, a display mode in which a display characteristic concerning the dark part of a picture is improved and priority is given to image quality rather than brightness of a screen. The surround sound mode suitable for reproduction of cinematic audio is a mode for multichannel audio reproduction in which cinematic stereophony can be satisfactorily restored. In this specification, the picture display mode and audio reproduction mode may be comprehensively called a picture-and-sounds mode. Aside from the theater mode, there is a normal mode in which both a picture mode and an audio mode are normal. The normal mode is a mode in which a picture is displayed in a normal manner and audio reproduction is achieved in a normal two-channel stereophonic manner. When the theater mode is canceled by designating a mode according to a genre or designating a mode by performing any other manipulation, a mode other than the normal mode may be designated.

As shown in FIG. 1, when the audiovisual amplifier 300 is connected to the television set 200, if the theater mode is designated, the group of loudspeakers 350 on the side of the audiovisual amplifier 300 is used preferentially. However, as described later, whichever of the group of loudspeakers and the loudspeaker of the television set is used can be selected by performing a loudspeaker switching manipulation. The television set 200 can notify the apparatuses, which are interconnected on the network, over the CEC line (CEC channel), which are supported by the HDMI, of the fact that the theater mode is designated or canceled.

An audio signal obtained by the tuner of the television set 200 is converted into, for example, an optical digital audio signal, and fed to the audiovisual amplifier 300 over the optical cable 702. For setting or releasing the audiovisual amplifier 300 to or from the system audio mode, a user may manipulate a user operating unit (not shown) of the audiovisual amplifier 300, or may manipulate a user operating unit (not shown) of the television set 200. The remote controller 800 of the television set 200 may be manipulated in order to give a loudspeaker switching instruction, whereby the audiovisual amplifier 300 may be set to the system audio mode.

When sounds represented by an audio signal obtained by the tuner of the television set 200 are outputted through the group of loudspeakers 350 connected to the audiovisual amplifier 300, if the audiovisual amplifier 300 is set to a genre interlocking mode, actions described below are performed. Specifically, based on genre information specified in an EPG which is fed from the television set 200 to the audiovisual amplifier 300 over the CEC line, the audiovisual amplifier 300 appends a sound-field characteristic to the audio signal sent from the television set 200.

When receiving information, which signifies that the theater mode is designated, from the television set 200, the audiovisual amplifier 300 optimizes a surround sound mode, in which a sound field and sound quality are designated for an audio signal to be processed internally, for cinematic audio processing. Audio is then outputted through the group of loudspeakers 350 in the surround sound mode. When information signifying that the theater mode is designated has been received, the processing of switching the loudspeaker of the television set 200 to the group of loudspeakers 350 on the side of the audiovisual amplifier 300 is carried out.

When the theater mode has been designated, even if the genre interlocking mode is designated, priority is given to the designation of the theater mode. Namely, when the theater mode has been designated, even if a genre is notified, the audiovisual amplifier 300 and television set 200 designate the sound field and sound quality associated with the theater mode.

The processing relating to designation or cancelation of the theater mode will be detailed later. The designation of the theater mode is broadcasted to all the apparatuses, which are interconnected on the network in conformity with the HDMI, with the logical addresses of the transmission destinations set to an address 15 (see FIG. 2).

Incidentally, for setting or releasing the audiovisual amplifier 300 to or from the genre interlocking mode, a user may manipulate the user operating unit (not shown) of the audiovisual amplifier 300. Otherwise, the user may manipulate the user operating unit (not shown) of the television set 200, or may manipulate the remote controller 800.

FIG. 3 shows an example of the relationship of association between genres and sound fields. FIG. 4 shows the features or characteristics of sound fields to be appended by the audiovisual amplifier 300.

In the audiovisual system 100 shown in FIG. 1, for example, when a switching manipulation is performed at the television set 200 or a manipulation is performed on a reproduction button of the video recorder 400, if a content reproduced from a disk by the video recorder 400 or a program whose channel is selected by the tuner is viewed, actions to be described below are carried out.

Specifically, an image represented by an output video signal of the video recorder 400 is displayed on the display panel (not shown) of the television set 200. In this case, the output video signal of the video recorder 400 is fed to the television set 200 via the audiovisual amplifier 300 over the HDMI cables 703 and 701.

When the audiovisual amplifier 300 is released from the system audio mode, sounds represented by an output audio signal of the video recorder 400 are outputted through the loudspeaker (not shown) of the television set 200. In this case, the output audio signal of the video recorder 400 is fed to the television set 200 via the audiovisual amplifier 300 over the HDMI cables 703 and 701.

When the audiovisual amplifier 300 is set to the system audio mode, the sounds represented by the output audio signal of the video recorder 400 are outputted through the group of loudspeakers 350 connected to the audiovisual amplifier 300. In this case, the output audio signal of the video recorder 400 is fed to the audiovisual amplifier 300 over the HDMI cable 703.

In this case, when the audiovisual amplifier 300 is set to the genre interlocking mode, actions to be described below are carried out. Specifically, the audiovisual amplifier 300 appends a sound-field property to an audio signal, which is sent from the video recorder 400, on the basis of genre information fed from the video recorder 400 to the audiovisual amplifier 300 over the CEC line (genre information specified in an EPG, content type information representing the type of content to be reproduced from a disk, etc.) (see FIG. 3 and FIG. 4). However, as described previously, when the theater mode is designated, priority is given to the designation of the theater mode.

In the audiovisual system 100 shown in FIG. 1, for example, when a content reproduced from a disk by the video player 500 is viewed by performing a switching manipulation at the television set 200 or performing a manipulation on a reproduction button of the video player 500, actions to be described below are carried out.

Specifically, an image represented by an output video signal of the video player 500 is displayed on the display panel (not shown) of the television set 200. In this case, the output video signal of the video player 500 is fed to the television set 200 via the audiovisual amplifier 300 over the HDMI cables 704 and 701.

When the audiovisual amplifier 300 is released from the system audio mode, sounds represented by an output audio signal of the video player 500 are outputted through the loudspeakers (not shown) of the television set 200. In this case, the output audio signal of the video player 500 is fed to the television set 200 via the audiovisual amplifier 300 over the HDMI cables 704 and 701.

When the audiovisual amplifier 300 is set to the system audio mode, the sounds represented by the output audio signal of the video player 500 are outputted through the group of loudspeakers 350 connected to the audiovisual amplifier 300. In this case, the output audio signal of the video player 500 is fed to the audiovisual amplifier 300 over the HDMI cable 704.

In this case, when the audiovisual amplifier 300 is set to the genre interlocking mode, actions to be described below are carried out. Specifically, based on genre information fed from the video player 500 to the audiovisual amplifier 300 over the CEC line (disk-type information representing the contents of a reproductive disk), the audiovisual amplifier 300 appends a sound-field characteristic to the audio signal sent from the video player 500 (see FIG. 3 and FIG. 4).

In the audiovisual system 100 shown in FIG. 1, for example, when a content reproduced from a disk by the video recorder 600 or a program whose channel is selected by the tuner is viewed by performing a switching manipulation at the television set 200, actions to be performed below are carried out.

Specifically, an image represented by an output video signal of the video recorder 600 is displayed on the display panel (not shown) of the television set 200. In this case, the output video signal of the video recorder 600 is fed to the television set 200 via the audiovisual amplifier 300 over the HDMI cables 705 and 701.

When the audiovisual amplifier 300 is released from the system audio mode, sounds represented by an output audio signal of the video recorder 600 are outputted through the loudspeaker (not shown) of the television set 200. In this case, the output audio signal of the video recorder 600 is fed to the television set 200 via the audiovisual amplifier 300 over the HDMI cables 705 and 701.

When the audiovisual amplifier 300 is set to the system audio mode, the sounds represented by the output audio signal of the video recorder 600 are outputted through the group of loudspeakers 350 connected to the audiovisual amplifier 300. In this case, the output audio signal of the video recorder 600 is fed to the audiovisual amplifier 300 over the HDMI cable 705.

In this case, when the audiovisual amplifier 300 is set to the genre interlocking mode, actions to be described below are carried out. Specifically, based on genre information fed from the video player 500 to the audiovisual amplifier 300 over the CEC line (disk-type information representing the contents of a reproductive disk), the audiovisual amplifier 300 appends a sound-field characteristic to the audio signal sent from the video player 500 (see FIG. 3 and FIG. 4).

2. Example of the Configuration of the Television Set (FIG. 5 and FIG. 6)

FIG. 5 shows an example of the configuration of the television set 200 to which an example of the embodiment is connected. The television set 200 includes the HDMI terminals 201 and 202, an HDMI switcher 204, an HDMI receiving unit 205, an antenna terminal 210, and a digital tuner 211. Further, the television set 200 includes a demultiplexer 212, a Moving Picture Expert Group (MPEG) decoder 213, a video/graphic processing circuit 214, a panel drive circuit 215, and a display panel 216. Further, the television set 200 includes an audio processing circuit 217, an audio amplification circuit 218, and a loudspeaker 219. Further, the television set 200 includes an internal bus 230, a central processing unit (CPU) 231, a flash ROM 232, a DRAM 233, and a remote control signal receiving unit 234.

The CPU 231 controls the actions of the components of the television set 200. The flash ROM 232 stores control software and preserves data items. The DRAM 233 provides a work area for the CPU 231. The CPU 231 deploys software or data, which is read from the flash ROM 232, in the DRAM 233 so as to start the software, and controls the components of the television set 200. The CPU 231, flash ROM 232, and DRAM 233 are interconnected over the internal bus 230. For controlling processing to be performed in the theater mode to be described later, the CPU 231 acts according to the control software stored in the flash ROM 232.

The remote control signal receiving unit 234 receives a remote control signal (remote control code) that is carried by, for example, infrared light and is sent from the remote controller 800, and feeds the signal to the CPU 231. By manipulating the remote controller 800, a user can operate the television set 200, and can operate the other CEC-compatible apparatus connected to the television set 200 over the HDMI cable.

The antenna terminal 210 is a terminal to which a television broadcast signal caught by a receiving antenna (not shown) is applied. The digital tuner 211 processes the television broadcast signal, which is applied to the antenna terminal 210, and outputs a predetermined transport stream. The demultiplexer 212 samples a partial transport stream (TS) (a TS packet of video data or a TS packet of audio data) on a user-selected channel from the transport stream obtained by the digital tuner 212.

The demultiplexer 212 fetches a program-specific information/service information (PSI/SI) from the transport stream obtained by the digital tuner 211, and outputs the PSI/SI to the CPU 231. Plural channels are multiplexed into the transport stream obtained by the digital tuner 211. The processing of sampling a partial TS on an arbitrary channel from the transport stream which is performed by the demultiplexer 212 is enabled by obtaining information on a packet ID (PID) on the arbitrary channel from the PSI/SI (PAT/PMT).

The MPEG decoder 213 decodes a video packetized elementary stream (PES), which includes a TS packet of video data obtained by the demultiplexer 212, so as to obtain video data. The MPEG decoder 213 decodes an audio PES, which includes a TS packet of audio data obtained by the demultiplexer 212, so as to obtain audio data.

The video/graphic processing circuit 214 performs, if necessary, scaling processing and graphic data superposing processing on the video data obtained by the MPEG decoder 213. The panel drive circuit 215 drives the display panel 216 on the basis of the video data outputted from the video/graphic processing circuit 214. The display panel 216 is formed with, for example, a liquid crystal display (LCD), an organic electroluminescent (EL) display, or a plasma display panel (PDP).

The audio processing circuit 217 performs necessary processing such as digital-to-analog conversion on the audio data obtained by the MPEG decoder 213. The audio amplification circuit 218 amplifies the analog audio signal outputted from the audio processing circuit 217, and feeds the resultant signal to the loudspeaker 219. The audio processing circuit 217 converts the audio data, which is obtained by the MPEG decoder 213, into a digital light signal, and outputs the signal to the optical output terminal 203.

The HDMI switcher 204 selectively connects the HDMI terminal 201 or 202 to the HDMI receiving unit 205. The HDMI receiving unit 205 is selectively connected to the HDMI connector 201 or 202 via the HDMI switcher 204. The HDMI receiving unit 205 receives video data and audio data, which are uni-directionally transmitted from an external apparatus (a source or a repeater) plugged into the HDMI terminal 201 or 202, through communication conformable to the HDMI. The HDMI receiving unit 205 will be detailed later.

The actions to be performed in the television set 200 shown in FIG. 5 will be briefed below. A television broadcast signal applied to the antenna terminal 210 is fed to the digital tuner 211. The digital tuner 211 processes the television broadcast signal so as to obtain a transport stream. The transport stream is fed to the demultiplexer 212. The demultiplexer 212 samples a partial TS (TS packet of video data or TS packet of audio data) on a user-selected channel from the transport stream. The partial TS is fed to the MPEG decoder 213.

The MPEG decoder 213 decodes a video PES, which includes the TS packet of video data, so as to obtain video data. The video data is, if necessary, subjected to scaling processing and graphic data superposing processing by the video/graphic processing circuit 214, and then fed to the panel drive circuit 215. Eventually, an image on the user-selected channel is displayed on the display panel 216.

The MPEG decoder 213 decodes an audio PES packet, which includes the TS packet of audio data, so as to obtain audio data. The audio data is subjected to necessary processing such as digital-to-analog conversion by the audio processing circuit 217, amplified by the audio amplification circuit 218, and then fed to the loudspeaker 219. Eventually, audio on the user-selected channel is outputted through the loudspeaker 219.

Audio data obtained by the MPEG decoder 213 is converted into a digital light signal, which is defined by, for example, the Sony Philips digital interface (S/PDIF) specifications, by the audio processing circuit 217, and applied to the optical output terminal 203. Therefore, the audio data can be transmitted to an external apparatus over the optical cable. In the audiovisual system 100 shown in FIG. 1, as mentioned above, the audio data sent from the television set 200 is fed to the audiovisual amplifier 300 over the optical cable 702.

When the audiovisual amplifier 300 is set to the system audio mode, audio represented by audio data sent from the television set 200 is outputted through the group of loudspeakers 350 connected to the audiovisual amplifier 300. In this case, the audio amplification circuit 218 is brought to a muting state by the CPU 231, and audio is not outputted through the loudspeaker 219 of the television set 200.

The HDMI receiving unit 205 obtains video data and audio data that are applied to the HDMI terminals 201 and 202 respectively over the HDMI cables. The video data is fed to the video/graphic processing circuit 214, while the audio data is fed to the audio processing circuit 217. Thereafter, the same actions as those performed when a television broadcast signal is received are carried out. An image is displayed on the display panel 216, and audio is outputted through the loudspeaker 219.

In the audiovisual system 100 shown in FIG. 1, for example, when an image and audio represented by video data and audio data respectively sent from the video recorder 400, video player 500, or video recorder 600 are enjoyed, the image and audio represented by the video data and audio data acquired by the HDMI receiving unit 205 are enjoyed as mentioned previously.

Even in this case, when the audiovisual amplifier 300 is set to the system audio mode, audio represented by audio data is outputted through the group of loudspeakers 350 connected to the audiovisual amplifier 300. The audio amplification circuit 218 of the television set 200 is brought to the muting state, and no audio is outputted through the loudspeaker 219.

FIG. 6 is a diagram showing an example of the shape of the remote controller 800 seen in front thereof. As shown in FIG. 6, the remote controller 800 includes a transmitting unit 801 that transmits an infrared light signal and others, and has various operating keys 802 arranged thereon. The operating keys 802 include channel indication numeral keys, volume increasing/decreasing keys, and mode designation keys. A theater mode key 802a is included as one of the mode designation keys. When the theater mode key 802a is depressed, the theater mode is designated. When the theater mode has been designated, if the theater mode key 802a is depressed again, the designation of the theater mode is canceled. Incidentally, the remote controller 800 may be designed to transmit a signal other than the infrared light signal, and may bi-directionally transfer data to or from the television set 200.

3. Example of the Configuration of the Audiovisual Amplifier
[FIG. 7]

FIG. 7 shows an example of the configuration of the audiovisual amplifier 300. The audiovisual amplifier 300 includes the HDMI terminals 301 to 304, an optical input terminal 305, an HDMI switcher 306, an HDMI receiving unit 307, an HDMI transmitting unit 308, and a conversion unit 310. The audiovisual amplifier 300 further includes an analog audio input terminal 311, an antenna terminal 312, a frequency modulation (FM) tuner 313, a selector 314, an analog-to-digital converter 315, a selector 316, and a digital signal processor (DSP) 317. Further, the audiovisual amplifier 300 includes an audio amplification circuit 318, audio output terminals 319a to 319f, an internal bus 320, a CPU 321, a flash ROM 322, and a DRAM 323.

Herein, the HDMI switcher 306 and selectors 314 and 316 constitute an audio input selection unit, and the DSP 317 serves as an audio signal processing unit. The audio amplification circuit 318 serves as an amplification unit for outputting an audio signal, and the CPU 321 serves as a sound field control unit and an output control unit.

The CPU 321 controls the actions of the components of the audiovisual amplifier 300. The flash ROM 322 stores control software and preserves data items. The DRAM 323 provides a work area for the CPU 321. The CPU 321 deploys software or data, which is read from the flash ROM 322, in the DRAM 323 so as to start the software, and controls the components of the audiovisual amplifier 300. The CPU 321, flash ROM 322, and DRAM 323 are interconnected over the internal bus 320. The processing of designating a sound field so as to designate the theater mode is executed under the control of the CPU 321 according to the program stored in the flash ROM 322.

A user operating unit 324 and a display unit 325 are connected to the CPU 321. The user operating unit 324 and display unit 325 constitute a user interface. A user uses the user operating unit 324 to select an audio output of the audiovisual amplifier 300 or designate a channel a signal on which is received by the FM tuner 313. The user uses the user operating unit 324 to designate or cancel the genre interlocking mode or designate or cancel the system audio mode. Therefore, the user operating unit 324 may be said to serve as a mode designation unit.

The user operating unit 324 includes keys, buttons, a dial, and a remote control signal transmitting/receiving block which are disposed in a housing of the audiovisual amplifier 300 that is not shown. The display unit 325 is formed with a liquid crystal display (LCD) or the like, and displays an operating state of the audiovisual amplifier 300 or a user's manipulating state.

The optical input terminal 305 is a terminal to which a digital light signal is applied over an optical cable. The conversion unit 310 uses the digital light signal, which is applied to the optical input terminal 305, to produce a clock LRCK that has the same frequency (for example, 44.1 kHz) as the sampling frequency for an audio signal, a master clock MCK whose frequency is 512 or 256 times higher than the sampling frequency, right-channel and left-channel audio data items RDATA and LDATA that have 24 bits long and appear at intervals of one cycle of the clock LRCK, and a bit clock BCK that is synchronous with each of bits constituting data. The conversion unit 310 then feeds the produced clocks and data items to the selector 316.

The analog audio input terminal 311 is a terminal to which right-channel and left-channel analog audio signals obtained by an external apparatus are applied. The antenna terminal 312 is a terminal to which a frequency-modulated broadcast signal received by the frequency-modulation receiving antenna (not shown) is applied. The frequency-modulation (FM) tuner 313 processes the frequency-modulated broadcast signal (radio broadcast signal) applied to the antenna terminal 312, and outputs right-channel and left-channel analog audio signals that fall within the user-selected channel. The selector 314 selectively fetches either of the analog audio signals applied to the analog audio input terminal 311 or the analog audio signals outputted from the tuner 313. The analog-to-digital converter 315 converts the analog audio signals, which are fetched by the selector 314, into digital audio data items, and feeds the data items to the selector 316.

The HDMI switcher 306 selectively connects any of the HDMI terminals 301 to 303 to the HDMI receiving unit 307. The HDMI receiving unit 307 is selectively connected to any of the HDMI terminals 301 to 303 via the HDMI switcher 306. The HDMI receiving unit 307 receives video data and audio data, which are uni-directionally transmitted from an external apparatus (source) plugged into any of the HDMI terminals 301 to 303, through communication conformable to the HDMI.

The HDMI receiving unit 307 feeds the audio data to the selector 316, and feeds the video data and audio data to the HDMI transmitting unit 308. The HDMI transmitting unit 308 transmits the video data and audio data, which are fed from the HDMI receiving unit 307 and carried by a baseband signal, through the HDMI terminal 304 by performing communication conformable to the HDMI. Accordingly, the audiovisual amplifier 300 exerts the capability of a repeater. The HDMI receiving unit 307 and HDMI transmitting unit 308 will be detailed later.

The selector 316 selectively fetches the audio data fed from the HDMI receiving unit 307, the audio data fed from the conversion unit 310, or the audio data fed from the analog-to-digital converter 315, and feeds the fetched data to the DSP 317.

The DSP 317 processes the audio data obtained by the selector 316, and performs the processing of producing audio data items, which are routed to respective channels, so as to realize surround-sound audio, the processing of appending a predetermined sound-field or acoustic characteristic, or the processing of converting a digital signal into an analog signal. For example, the DSP 317 can handle a sound field for 5.1-channel surround sound audio. In addition, the DSP 317 can realize a two-channel audio mode or any other mode. The audio amplification circuit 318 amplifies a front left audio signal $S_{FL}$, a front right audio signal $S_{FR}$, a front center audio signal $S_{FC}$, a rear left audio signal $S_{RL}$, a rear right audio signal $S_{RR}$, and a subwoofer audio signal $S_{SW}$ which are outputted from the DSP 317, and applies the resultant signals to the audio output terminals 319a to 319f respectively.

The loudspeakers included in the group of loudspeakers 350 are plugged into the audio output terminals 319a to 319f respectively, though they are not shown. Specifically, a front left loudspeaker, a front right loudspeaker, a front center loudspeaker, a rear left loudspeaker, a rear right loudspeaker, and a subwoofer loudspeaker are plugged into the output terminals. However, surround-sound audio may be reproduced using a smaller number of loudspeakers by designing the DSP 317 to perform virtual sound image localization processing or the like.

Actions to be performed in the audiovisual amplifier 300 shown in FIG. 7 will be briefed below. The HDMI receiving unit 307 obtains video data and audio data that are carried by a baseband signal and applied to any of the HDMI terminals 301 to 303 over the HDMI cable. The video data and audio data are fed to the HDMI transmitting unit 308, and transmitted over the HDMI cable coupled to the HDMI terminal 304.

The audio data obtained by the HDMI receiving unit 307 is fed to the selector 316. The selector 316 selectively fetches the audio data fed from the HDMI receiving unit 307, the audio data fed from the conversion unit 310, or the audio data fed from the analog-to-digital converter 315, and feeds the fetched data to the DSP 317.

The DSP 317 performs on the audio data necessary processing, such as, the processing of producing audio data items that are routed to respective channels in order to realize the 5.1-channel surround sound, the processing of appending a predetermined sound-field characteristic, or the processing of converting a digital signal to an analog signal. The audio signals to be outputted from the DSP 317 and routed to the respective channels are applied to the audio output terminals 319a to 319f respectively via the audio amplification circuit 318.

For example, in the audiovisual system 100 shown in FIG. 1, when a program on a channel selected by the digital tuner 211 of the television set 200 is viewed, if the audiovisual amplifier 300 is set to the system audio mode, actions to be performed below are carried out. Specifically, the selector 316 fetches audio data from the conversion unit 310. Accordingly, audio signals that are routed to the respective channels and produced from the audio data of the program on the channel selected by the digital tuner 211 of the television set 200 are applied to the audio output terminals 319a to 319f respectively. Therefore, the audio of the program on the channel selected by the digital tuner 211 of the television set 200 is outputted through the group of loudspeakers 350 connected to the audiovisual amplifier 300.

When the audiovisual amplifier 300 is set to the genre interlocking mode, the DSP 317 appends a sound-field characteristic, which is associated with genre information fed from the television set 200 over the CEC line, to the audio data fetched by the selector 316. Therefore, the audio to be outputted through the group of loudspeakers 350 connected to the audiovisual amplifier 300 takes on the sound-field characteristic associated with the genre of the program on the channel selected by the digital tuner 211 of the television set 200. When the theater mode is designated at the television set 200, the sound field predetermined in association with the theater mode is designated.

When a program on a channel selected by the digital tuner 211 of the television set 200 is viewed, if the audiovisual amplifier 300 is released from the system audio mode, the audio amplification circuit 318 is brought to the muting state. Therefore, no audio signal is fed from the audio amplification circuit 318 to the output terminals 319a to 319f.

For example, in the audiovisual system 100 shown in FIG. 1, when an image represented by video data sent from the video recorder 400 and audio represented by audio data sent therefrom are enjoyed, if the audiovisual amplifier 300 is set to the system audio mode, actions to be performed below are carried out. Specifically, the HDMI switcher 306 connects the HDMI terminal 301 to the HDMI receiving unit 307. The selector 316 fetches audio data from the HDMI receiving unit 307. Accordingly, audio signals that are routed to the respective channels and produced from the audio data sent from the video recorder 400 are applied to the audio output terminals 319a to 319f respectively. Therefore, audio represented by the audio data sent from the video recorder 400 is outputted through the group of loudspeakers 350 connected to the audiovisual amplifier 300.

When the audiovisual amplifier 300 is set to the genre interlocking mode, the DSP 317 appends a sound-field characteristic, which is associated with genre information fed from the video recorder 400 over the CEC line, to the audio data fetched by the selector 316.

When an image represented by video data sent from the video recorder 400 and audio represented by audio data sent therefrom are enjoyed, if the audiovisual amplifier 300 is released from the system audio mode, the audio amplification circuit 318 is brought to the muting state. No audio signal is applied from the audio amplification circuit 318 to the audio output terminals 319a to 319f.

For example, in the audiovisual system 100 shown in FIG. 1, when an image represented by vide data sent from the video player 500 and audio represented by audio data sent therefrom are enjoyed, if the audiovisual amplifier 300 is set to the system audio mode, actions to be performed below are carried out. Specifically, the HDMI switcher 306 connects the HDMI terminal 302 to the HDMI receiving unit 307. The selector 316 fetches audio data from the HDMI receiving unit 307. Accordingly, audio signals that are routed to the respective channels and produced from the audio data sent from the video player 500 are applied to the audio output terminals 319a to 319f respectively. Therefore, audio represented by the audio data sent from the video player 500 is outputted through the group of loudspeakers 350 connected to the audiovisual amplifier 300.

When the audiovisual amplifier 300 is set to the genre interlocking mode, the DSP 317 appends a sound-field characteristic, which is associated with genre information fed from the video player 500 over the CEC line, to the audio data fetched by the selector 316. Therefore, audio outputted through the group of loudspeakers 350 connected to the audiovisual amplifier 300 takes on the sound-field characteristic associated with the type of content to be reproduced from the disk of the video player 500.

When the audiovisual amplifier 300 is instructed to be set to the theater mode by the television set 200, the sound field associated with the theater mode is preferentially designated rather than the sound-field characteristic associated with the genre information is.

When an image represented by video data sent from the video player 500 and audio represented by audio data sent therefrom are enjoyed, if the audiovisual amplifier 300 is released from the system audio mode, the audio amplification circuit 318 is brought to the muting state. No audio signal is therefore applied from the audio amplification circuit 318 to the audio output terminals 319a to 319f.

4. Example of the Transmission Form Conformable to the HDMI Specifications and Example Of Processing [FIG. 8 to FIG. 12]

FIG. 8 shows an example of the configurations of the HDMI transmitting unit (HDMI transmitting unit 308 or 402) and the HDMI receiving unit (HDMI receiving unit 205 or 307).

The HDMI transmitting unit (HDMI source) performs one unit of transmission during an effective image interval (hereinafter, may be called an active video interval) that is an interval obtained by removing a horizontal blanking interval and a vertical blanking interval from an interval that lasts from a vertical synchronizing (sync) signal to the next vertical sync signal. Specifically, during the active video interval, the HDMI transmitting unit transmits differential signals, which carry non-compressed pixel data of an image for one screen, unidirectionally to the HDMI receiving unit (HDMI sink) over plural channels. During the horizontal blanking interval or vertical blanking interval, differential signals that carry at least audio data, control data, and other auxiliary data accompanying an image are unidirectionally transmitted to the HDMI receiving unit over plural channels.

The HDMI transmitting unit includes a transmitter 81. The transmitter 81 converts, for example, non-compressed pixel data of an image into differential signals, and serially transmits the differential signals unidirectionally to the HDMI receiving unit, which is connected to the HDMI transmitting unit over the HDMI cable, over plural channels, that is, three TMDS channels 0, 1, and 2.

The transmitter 81 converts audio data accompanying a non-compressed image, necessary control data, and other auxiliary data into differential signals. The differential signals are serially transmitted unidirectionally to the HDMI receiving unit, which is connected to the HDMI transmitting unit over the HDMI cable, over the three TMDS channels 0, 1, and 2.

Further, the transmitter 81 transmits a pixel clock, which is synchronous with pixel data to be transmitted over the three TMDS channels 0, 1, and 2, to the HDMI receiving unit, which is connected to the HDMI transmitting unit over the HDMI cable, over a TMDS clock channel. Over one TMDS channel i (where i denotes 0, 1, or 2), pixel data of ten bits long is transmitted during the duration of one pixel clock.

The HDMI receiving unit receives differential signals, which carry pixel data and are transmitted unidirectionally from the HDMI transmitting unit over the plural channels, during the active video interval. The HDMI receiving unit receives differential signals, which carry audio data and control data and are unidirectionally transmitted from the HDMI transmitting unit over the plural channels, during the horizontal blanking interval or vertical blanking interval.

Specifically, the HDMI receiving unit includes a receiver 82. The receiver 82 receives differential signals, which carry pixel data and are unidirectionally transmitted from the HDMI transmitting unit, and differential signals, which carry audio data and control data and are unidirectionally transmitted from the HDMI transmitting unit, over the TMDS channels 0, 1, and 2. At this time, the HDMI receiving unit receives the differential signals synchronously with the pixel clock sent from the HDMI transmitting unit over the TMDS clock channel.

The transmission channels of an HDMI system include three TMDS channels 0 to 2 serving as transmission channels over which pixel data and audio data are serially transmitted, and the TMDS clock channel that is a transmission channel over which the pixel clock is transmitted. In addition, transmission channels called a display data channel (DDC) 83 and a CEC line 84 are included.

Using the DDC 83, the HDMI transmitting unit reads enhanced extended display identification data (E-EDID) from the HDMI receiving unit connected thereto over the HDMI cable. The DDC 83 is formed with two signal lines that are not shown and are included in the HDMI cable.

Specifically, the HDMI receiving unit includes, in addition to the HDMI receiver 82, an EDID ROM 85. The EDID ROM 85 stores E-EDID that is performance information concerning the performance of the HDMI receiving unit (configuration and capability). The HDMI transmitting unit reads the E-EDID of the HDMI receiving unit from the HDMI receiving unit, which is connected thereto over the HDMI cable, over the DDC 83. Based on the read E-EDID, the format (profile) of an image supported by an electronic apparatus including the HDMI receiving unit, for example, the RGB format, YCbCr4:4:4 format, or YCbCr4:2:2 format is identified.

The CEC line 84 is formed with one signal line that is not shown and is included in the HDMI cable, and used to bi-directionally communicate control data between the HDMI transmitting unit and HDMI receiving unit. The bidirectional communication is performed on a time-division basis.

The HDMI cable includes a line 86 that is coupled to a pin called Hot Plug Detect (HPD). A source can detect the connection of a sink by utilizing the line 86. Further, the HDMI cable includes a line 87 to be used to feed power from the source to the sink. Further, the HDMI cable includes a reserved line 88.

FIG. 9 shows an example of the configurations of the HDMI transmitter 81 and HDMI receiver 82 shown in FIG. 8.

The transmitter 81 includes three encoding and serializing blocks 81A, 81B, and 81C associated with the three TMDS channels 0, 1, and 2. The encoding and serializing blocks 81A, 81B, and 81C encode fed image data, auxiliary data, and control data, convert them from parallel data to serial data, and transmit the data items in the form of differential signals.

When image data includes, for example, three components of red (R), green (G), and blue (B), the blue component is fed to the encoding and serializing block 81A, the green component is fed to the encoding and serializing block 81B, and the red component is fed to the encoding and serializing block 81C.

The auxiliary data includes, for example, audio data and a control packet. The control packet is fed to, for example, the encoding and serializing block 81A, and the audio data is fed to the encoding and serializing blocks 81B and 81C.

Further, the control data includes, for example, one bit carried by a vertical sync signal (VSYNC), one bit carried by a horizontal sync signal (HSYNC), and one-bit control bits CTL0, CTL1, CTL2, and CTL3. The vertical sync signal and horizontal sync signal are fed to the encoding and serializing block 81A. The control bits CTL0 and CTL1 are fed to the encoding and serializing block 81B, and the control bits CTL2 and CTL3 are fed to the encoding and serializing block 81C.

The encoding and serializing block 81A transmits the blue component of image data, the vertical sync signal and horizontal sync signal, and the auxiliary data on a time-division basis. That is, the encoding and serializing block 81A converts the fed blue component of image data into parallel data in units of a fixed number of bits, that is, eight bits. Further, the encoding and serializing block 81A encodes the parallel data, converts it into serial data, and transmits the serial data over the TMDS channel 0.

The encoding and serializing block 81A encodes parallel data of two bits long carried by the fed vertical sync signal and horizontal sync signal, converts the parallel data into serial data, and transmits the serial data over the TMDS channel 0. The encoding and serializing block 81A treats auxiliary data as parallel data in units of four bits. The encoding and serializing block 81A encodes the parallel data, converts the parallel data into serial data, and transmits the serial data over the TMDS channel 0.

The encoding and serializing block 81B transmits the green component of image data, the control bits CTL0 and CTL1, and the auxiliary data on a time-division basis. Specifically, the encoding and serializing block 81B treats the fed green component of image data as parallel data in units of a fixed number of bits, that is, eight bits. The encoding and serializing block 81B encodes the parallel data, converts the parallel data into serial data, and transmits the serial data over the TMDS channel 1.

The encoding and serializing block 81B encodes parallel data of two bits long carried by the fed control bits CTL0 and CTL1, converts the parallel data into serial data, and transmits the serial data over the TMDS channel 1. Further, the encoding and serializing block 81B treats the fed auxiliary data as parallel data in units of four bits. The encoding and serializing block 81B encodes the parallel data, converts the parallel data into serial data, and transmits the serial data over the TMDS channel 1.

The encoding and serializing block 81C transmits the fed red component of image data, the control bits CTL2 and CTL3, and the auxiliary data on a time-division basis. Specifically, the encoding and serializing block 81C treats the fed red component of image data as parallel data in units of a fixed number of bits, that is, eight bits. Further, the encoding and serializing block 81C encodes the parallel data, converts the parallel data into serial data, and transmits the serial data over the TMDS channel 2.

The encoding and serializing block 81C encodes parallel data of two bits long including the fed control bits CTL2 and CTL3, converts the parallel data into serial data, and transmits the serial data over the TMDS channel 2. Further, the encoding and serializing block 81C treats the fed auxiliary data as parallel data in units of four bits. The encoding and serializing block 81C encodes the parallel data, converts the parallel data into serial data, and transmits the serial data over the TMDS channel 2.

The receiver 82 includes three recovering and decoding blocks 82A, 82B, and 82C associated with the three TMDS channels 0, 1, and 2. The recovering and decoding blocks 82A, 82B, and 82C receive image data, auxiliary data, and control data that are transmitted in the form of differential signals over the TMDS channels 0, 1, and 2. Further, the recovering and decoding blocks 82A, 82B, and 82C convert the image data, auxiliary data, and control data from serial data into parallel data, decode the parallel data items, and output the resultant data items.

Specifically, the recovering and decoding block 82A receives a blue component of image data, a vertical sync signal and a horizontal sync signal, and auxiliary data which are transmitted in the form of differential signals over the TMDS channel 2. The recovering and decoding block 82A converts the blue component of image data, the vertical sync signal and horizontal sync signal, and the auxiliary data from serial data into parallel data, decodes the parallel data items, and outputs the resultant data items.

The recovering and decoding block 82B receives a green component of image data, control bits CTL0 and CTL1, and auxiliary data which are transmitted in the form of differential signals over the TMDS channel 1. The recovering and decoding block 82B converts the green component of image data, the control bits CTL0 and CTL1, and the auxiliary data from serial data into parallel data, decodes the parallel data items, and outputs the resultant data items.

The recovering and decoding block 82C receives a red component of image data, control bits CTL2 and CTL3, and auxiliary data which are transmitted in the form of differential signals over the TMDS channel 2. The recovering and decoding block 82C converts the red component of image data, the control bits CTL2 and CTL3, and the auxiliary data from serial data to parallel data, decodes the parallel data items, and outputs the resultant data items.

Figure 10:
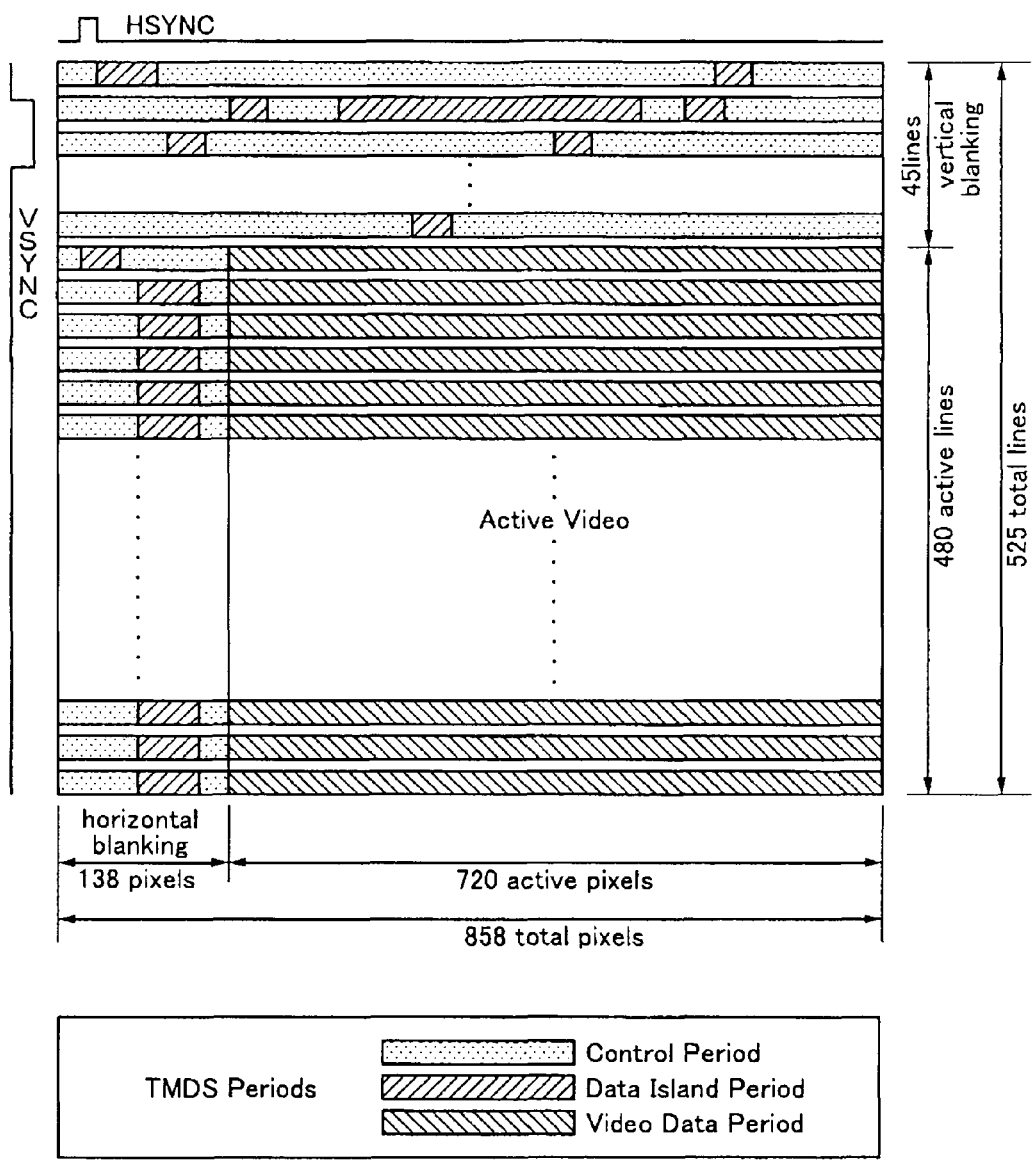
FIG. 10 is a diagram showing the structure of TMDS transmission data.

FIG. 10 shows an example of transmission intervals (periods) during which various kinds of transmission data items are transmitted over the three TMDS channels 0, 1, and 2 of the HDMI cable. FIG. 10 shows the intervals for the various kinds of transmission data items applied to a case where a progressively scanned image having 720 pixels in rows and 480 pixels in columns is transmitted over the TMDS channels 0, 1, and 2.

A video field interval within which transmission data is transmitted over the three TMDS channels 0, 1, and 2 of the HDMI cable includes intervals described below according to the type of transmission data. Specifically, the video field interval includes a video data interval (period), a data island interval (period), and a control interval (period).

The video field interval is an interval elapsing from the leading (active) edge of a certain vertical sync signal to the leading edge of the next vertical sync signal. The interval falls into a horizontal blanking interval, a vertical blanking interval, and an active video interval. The active video interval is an interval obtained by removing the horizontal blanking interval and vertical blanking interval from the video field interval.

The video data interval is allocated to the active video interval. During the video data interval, effective (active) pixel data including a product of 720 pixels by 480 lines, that is, uncompressed image data for one screen is transmitted.

The data island interval and control interval are allocated to the horizontal blanking interval and vertical blanking interval. During the data island interval and control interval, auxiliary data is transmitted.

Specifically, the data island interval is allocated to part of the horizontal blanking interval and part of the vertical blanking interval. During the data island interval, auxiliary data having nothing to do with control, for example, a packet of audio data is transmitted.

The control interval is allocated to the other part of the horizontal blanking interval and the other part of the vertical blanking interval. During the control interval, auxiliary data relating to control, for example, a vertical sync signal, a horizontal sync signal, and a control packet are transmitted.

According to the ongoing HDMI specifications, the frequency of a pixel clock to be transmitted over the TMDS clock channel is, for example, 165 MHz. In this case, the transmission rate to be attained during the data island interval is on the order of 500 Mbps.

Figure 11:
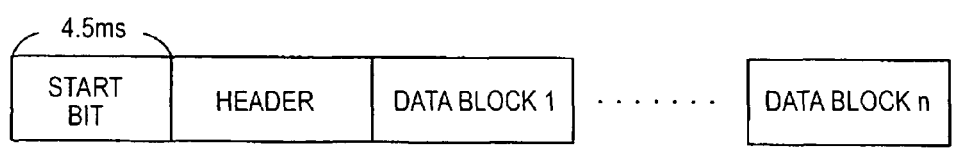
FIG. 11 is a diagram showing the structure of data to be transmitted over a CEC line (a CEC channel)
Figure 12:
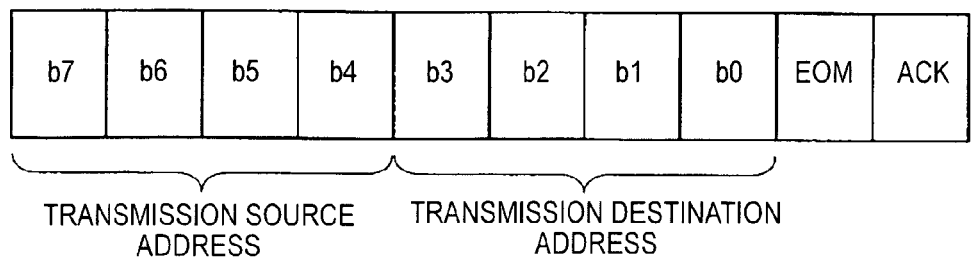
FIG. 12 is a diagram showing an example of a data structure of a header.

FIG. 11 shows the structure of a data block to be transmitted over the CEC line (CEC channel). Over the CEC line, one block is transmitted for 4.5 msec. A start bit is assigned to the beginning of data transmission, and is succeeded by a header. The header is succeeded by an arbitrary number of data blocks (n data blocks) each including data to be actually transmitted. FIG. 12 shows an example of the data structure of the header. A logical address (source address) of a transmission source and a logical address (sink address) of a transmission destination are assigned to the header.

5. Example of Processing to be Performed at a Time of Designating the Theater Mode and Example of Processing to be Performed at a Time of Canceling the Theater Mode [FIG. 13 to FIG. 20]

Next, an example of actions to be performed in the system when the theater mode is designated at the television set 200 will be described below. The actions are performed under the control of the CPU 231 in the television set 200 or under the control of the CPU 321 in the audiovisual amplifier 300.

Figure 13:
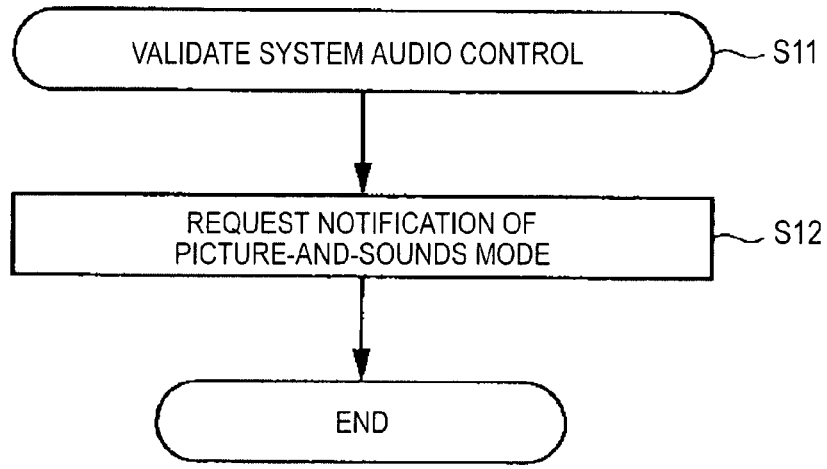
FIG. 13 is a flowchart showing an example of actions to be performed in an audiovisual amplifier in accordance with the embodiment of the present invention (in a case where system audio control is validated)

To begin with, referring to the flowchart of FIG. 13, an example of actions to be performed in a case where system audio control is validated in the audiovisual amplifier 300.

When validation of system audio control is instructed (step S11), the television set 200 is requested to notify the picture-and-sounds mode over the CEC channel (step S12). The validation of system audio control is instructed at step S11 in a case where outputting sounds through the loudspeaker of the television set 200 is switched to outputting of sounds through the group of loudspeakers 350 connected to the audiovisual amplifier 300 or in a case where the power supply of the audiovisual amplifier 300 is turned on.

Figure 14:
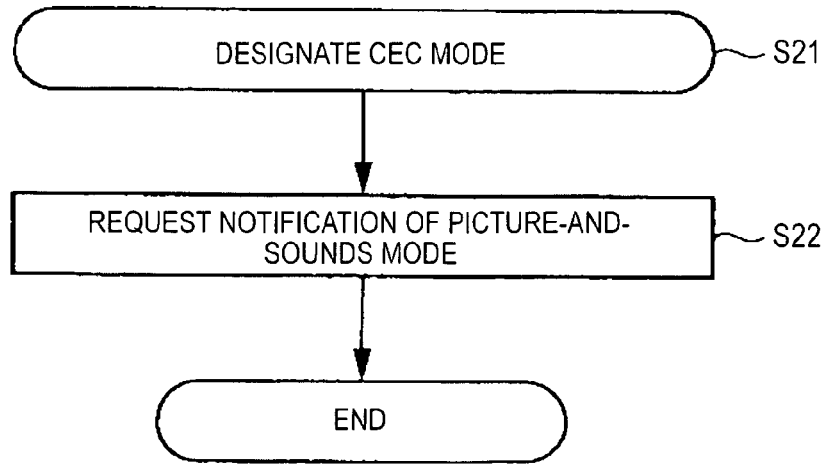
FIG. 14 is a flowchart showing an example of actions to be performed in the audiovisual amplifier in accordance with the embodiment of the present invention (in a case where the CEC mode is designated)

Next, referring to the flowchart of FIG. 14, an example of actions to be performed in a case where the consumer electronics control (CEC) mode being canceled is designated in the audiovisual amplifier 300 will be described below.

When the CEC mode is designated (step S21), the television set 200 is requested to notify the picture-and-sounds mode by transmitting a CEC message (step S22).

Figure 15:
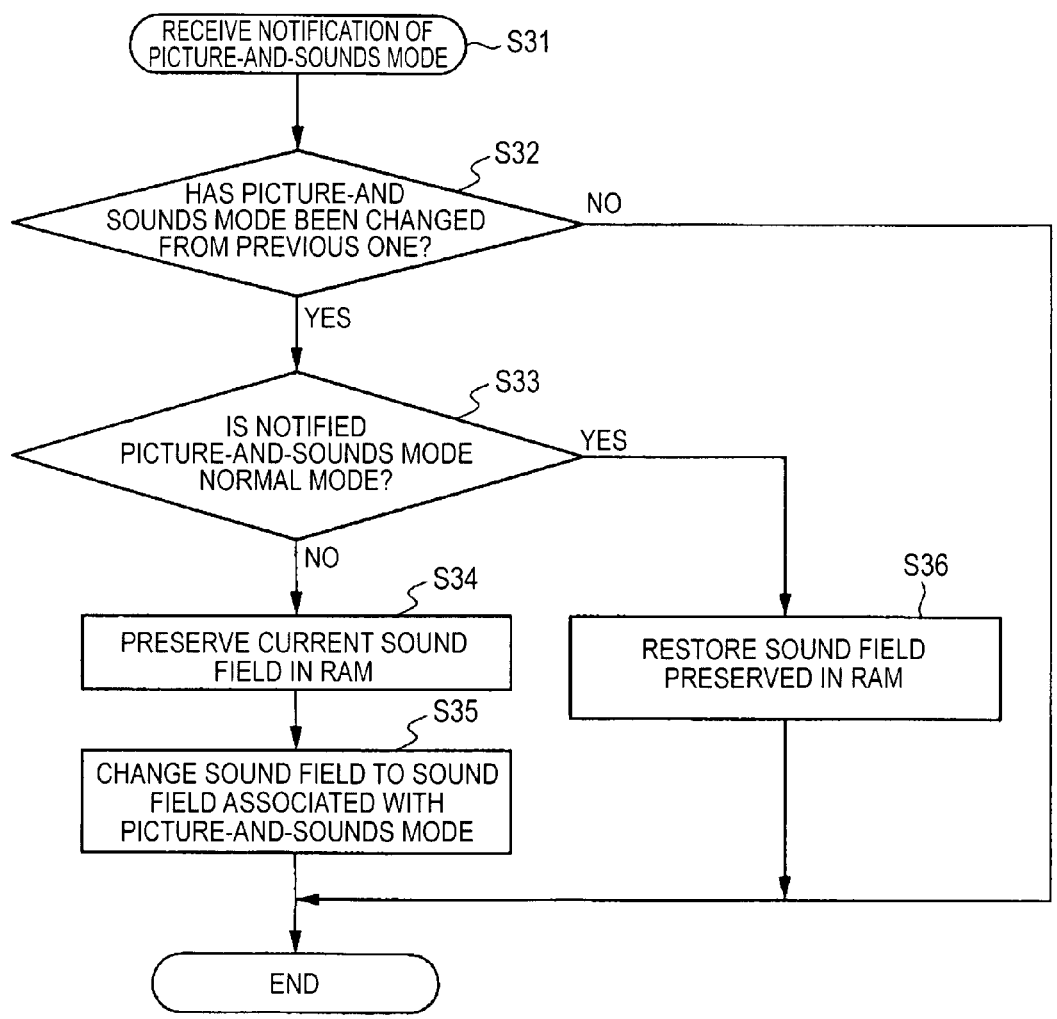
FIG. 15 is a flowchart showing an example of actions to be performed in the audiovisual amplifier in accordance with the embodiment of the present invention (in a case where designation of a CEC picture-and-sounds mode is notified)

Next, referring to the flowchart of FIG. 15, an example of actions to be performed in a case where the audiovisual amplifier 300 has received a requested notification of a picture-and-sounds mode will be described.

When information on a picture-and-sounds mode is received over the CEC channel (step S31), whether the notified picture-and-sound mode has been changed from the previous one is decided (step S32). If the picture-and-sounds mode has been changed, whether the notified picture-and-sounds mode is a normal mode is decided (step S33). In case of the normal mode, the processing of restoring a previously designated sound field preserved in the RAM 323 of the audiovisual amplifier is carried out (step S36). If the notified picture-and-sounds mode is not the normal mode, the sound field currently being designated is preserved in the RAM 323 (step S34), and is changed to a sound field associated with the notified picture-and-sounds mode (step S35). For example, when the theater mode is notified as the picture-and-sounds mode, the sound field is changed to the predetermined sound field associated with the surround sound mode.

Figure 16:
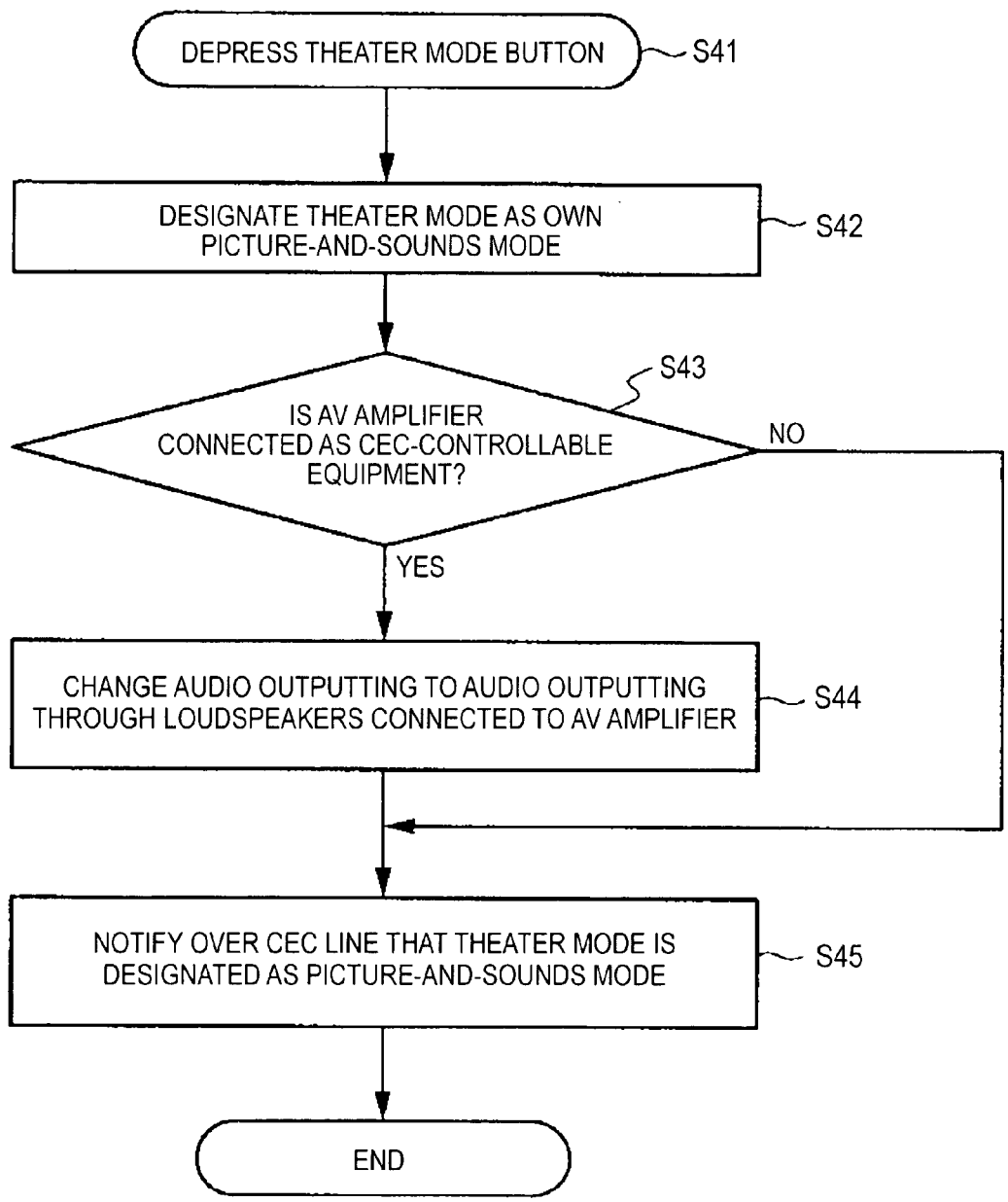
FIG. 16 is a flowchart showing an example of actions to be performed in the television set to which the embodiment of the present invention is connected (in a case where a theater mode is designated)

Next, referring to the flowchart of FIG. 16, an example of actions to be performed in a case where a manipulation is performed at the television set 200 in order to designate the theater mode.

To begin with, when the theater mode is designated (step S41) by depressing the theater mode button 802a (FIG. 6) of the remote controller 800, the theater mode is designated as the picture-and-sounds mode of the television set (step S42). At this time, an associated picture display mode is designated.

Whether the audiovisual amplifier 300 is connected as an apparatus controllable over the CEC channel is decided (step S43). If the audiovisual amplifier 300 is connected, audio outputting is changed to audio outputting through the group of loudspeakers 350 of the audiovisual amplifier 300 (step S44). Thereafter, the fact that the picture-and-sounds mode is the theater mode is broadcasted over the CEC line (step S45). Even when the audiovisual amplifier is not connected, broadcasting is performed at step S45.

Figure 17:
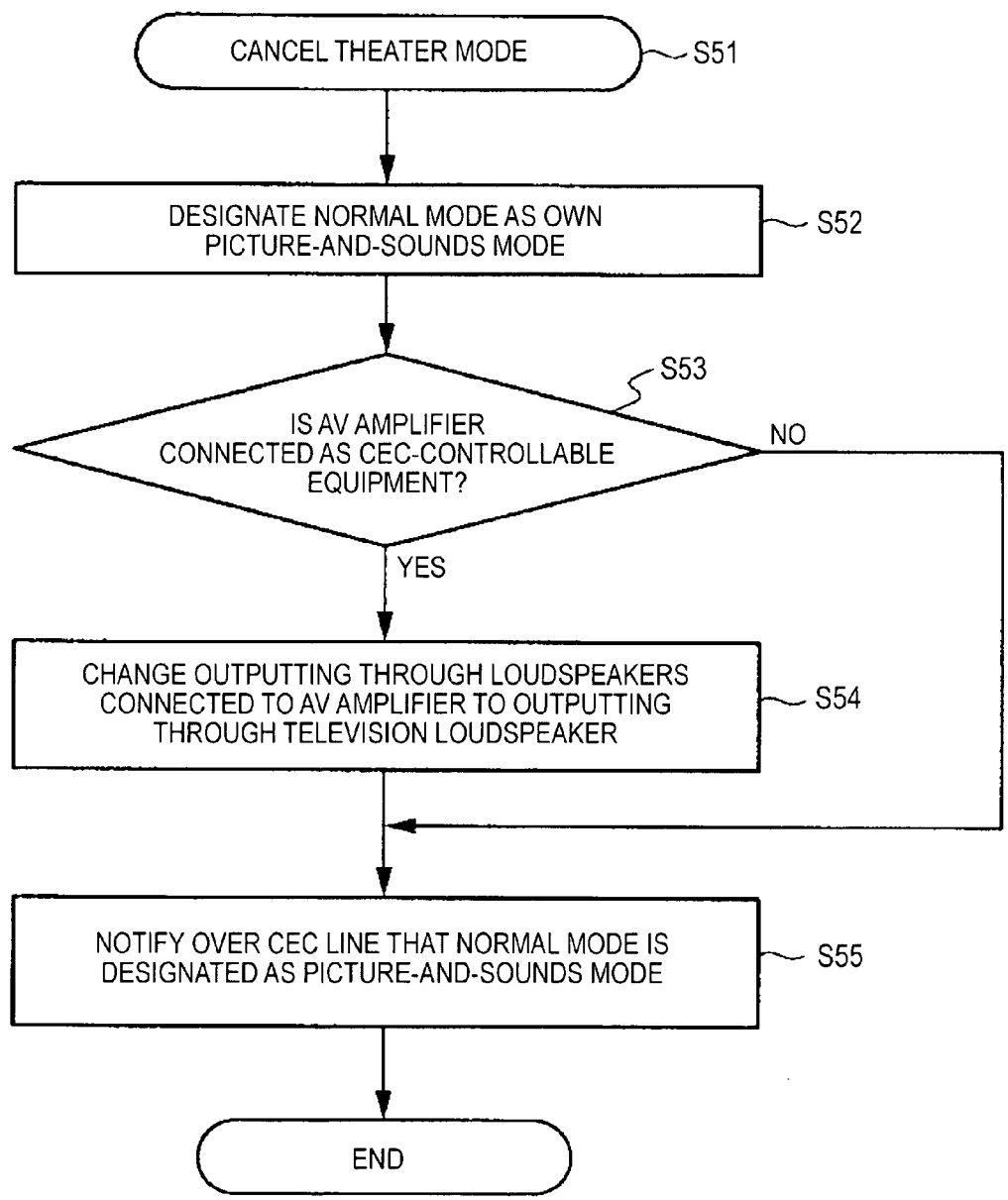
FIG. 17 is a flowchart showing an example of actions to be performed in the television set to which the embodiment of the present invention is connected (in a case where the theater mode is canceled)

Next, referring to the flowchart of FIG. 17, an example of actions to be performed in a case where the theater mode is canceled in the television set 200 will be described below.

To begin with, when the theater mode is designated, if the theater mode is canceled (step S51) by depressing the theater mode button 802a (FIG. 6) of the remote controller 800, the normal mode is designated as the picture-and-sounds mode of the television set (step S52). At this time, the picture display mode is returned to a mode designated before the theater mode is designated.

Whether the audiovisual amplifier 300 is connected as an apparatus controllable over the CEC channel is decided (step S53). If the audiovisual amplifier 300 is connected, audio outputting is changed from outputting through the group of loudspeakers 350 connected to the audiovisual amplifier 300 to outputting through the loudspeaker of the television set 200 (step S54). However, the loudspeaker to be used at a time of cancelation varies depending on a state attained before the theater mode is designated. A concrete example of switching the loudspeakers will be described later.

After step S54 is completed, the fact that the normal mode is designated as the picture-and-sounds mode is broadcasted over the CEC line (step S55). Even when the audiovisual amplifier is not connected, the broadcasting of step S55 is carried out.

Figure 18:
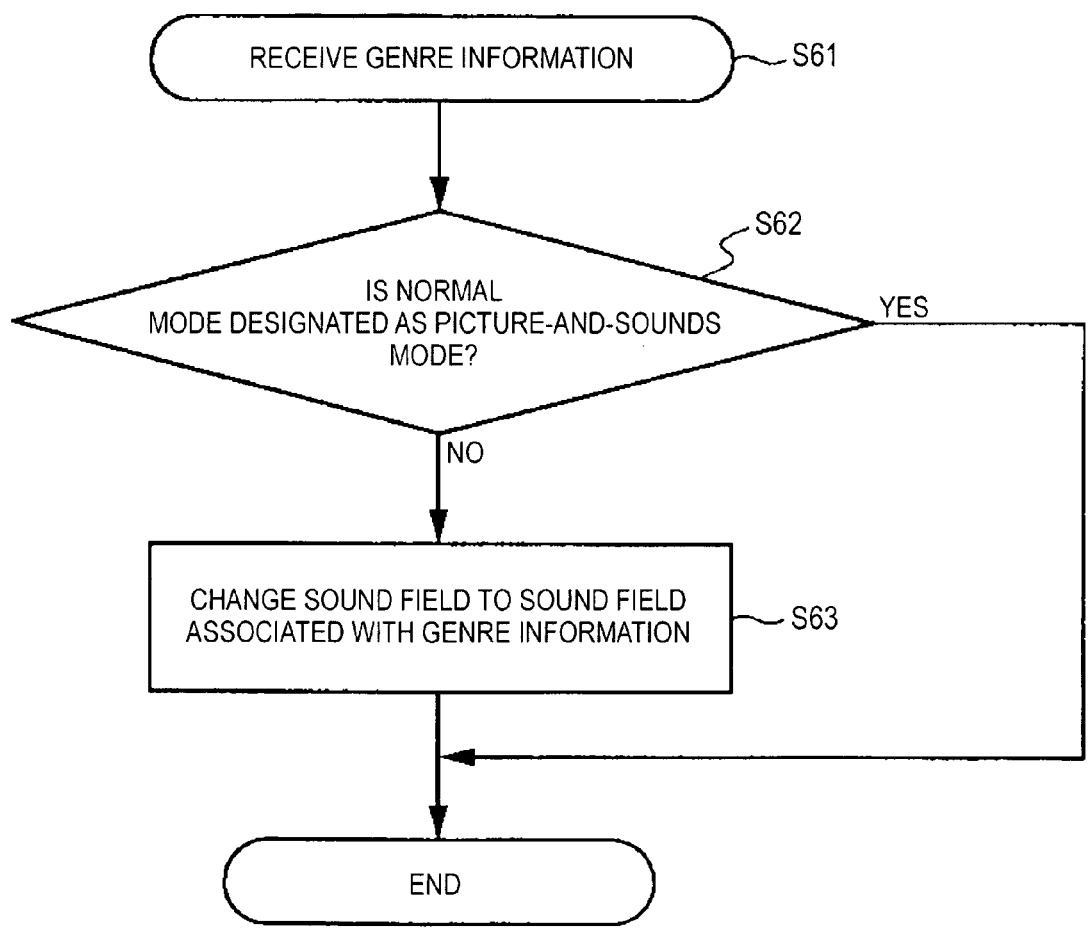
FIG. 18 is a flowchart showing an example of actions to be performed in the audiovisual amplifier in accordance with the embodiment of the present invention (in a case where genre information is received)

Next, referring to the flowchart of FIG. 18, an example of actions to be performed in a case where the audiovisual amplifier 300 has received genre information will be described below.

To begin with, genre information is received over the CEC line (step S61). Whether the normal mode is designated as the picture-and-sounds mode is decided (step S62). If the normal mode is designated, a sound field is changed to a sound field associated with the received genre information (step S63). If the normal mode is not designated (that is, the theater mode or the like is designated), the sound field is not changed to the sound field associated with the genre information.

Figure 19:
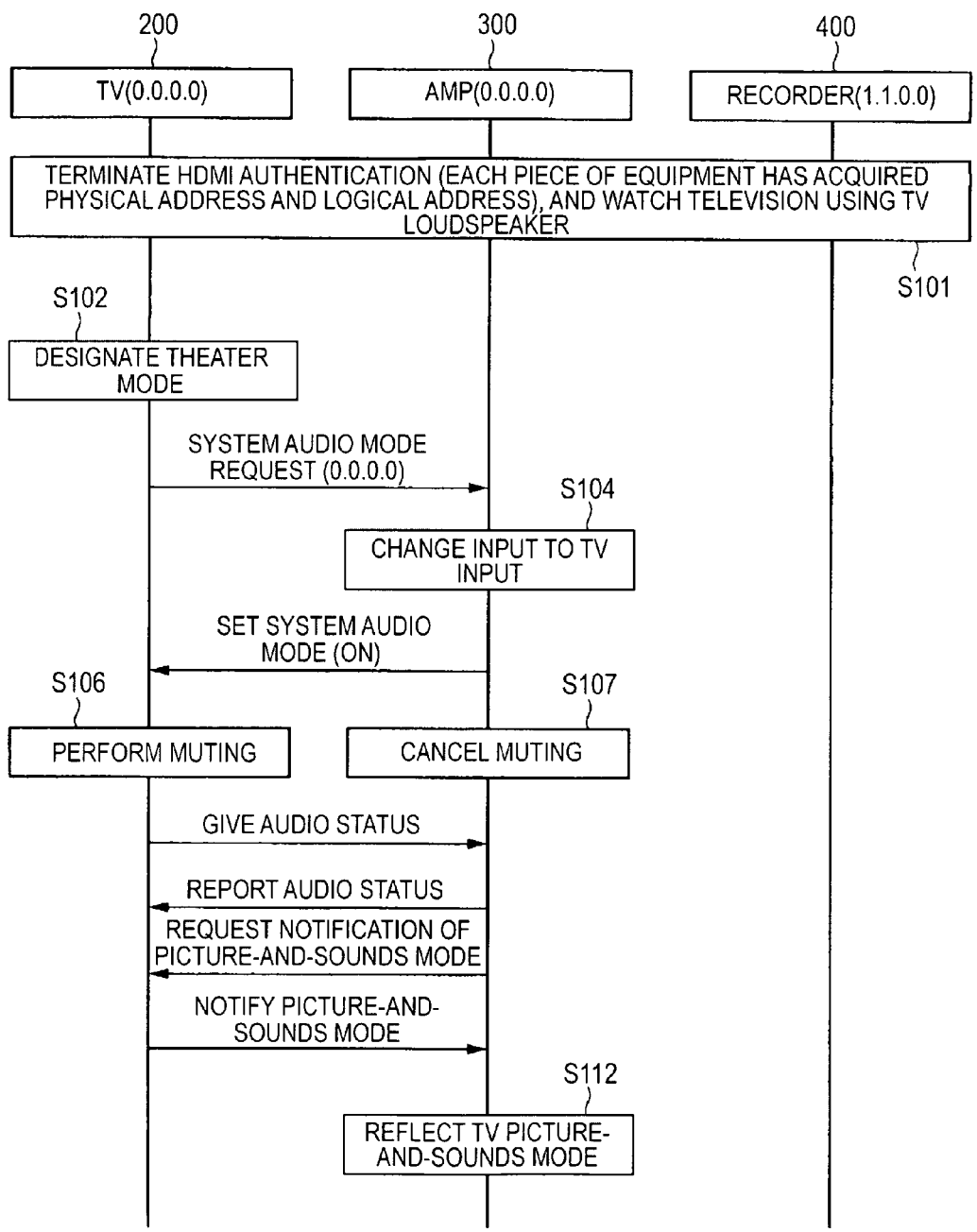
FIG. 19 is a sequence diagram showing an example of a communicating state attained in the embodiment of the present invention.

FIG. 19 is a diagram showing a communicating state of the television set and audiovisual amplifier attained in a case where the theater mode is designated in the television set.

In FIG. 19, the television set 200, audiovisual amplifier 300, and video recorder 400 are shown as a network conformable to the HDMI. The video recorder 400 does not perform processing other than authentication.

To begin with, the HDMI authentication processing has been terminated (step S101). In this state, when a manipulation is performed at the television set 200 in order to designate the theater mode (step S102), the audiovisual amplifier 300 is requested to designate the system audio mode (step S103). On receipt of the request, the audiovisual amplifier 300 changes modes thereof so that an audio signal transmitted from the television set over the optical cable will be outputted (step S104), and returns a message saying that the system audio mode has been designated (step S105). However, at step S104, an audio output is muted but is not outputted.

Thereafter, the television set 200 performs muting processing (step S106). Concurrently, the audiovisual amplifier 300 performs muting canceling processing (step S107). Thereafter, the television set 200 queries the audiovisual amplifier 300 about the audio state (step S108). In response to the query, the setting of the audiovisual amplifier 300 is verified (step S109). Thereafter, the audiovisual amplifier 300 requests the television set 200 to notify the picture-and-sounds mode (step S110). With the response to the request, the audiovisual amplifier 300 verifies the picture-and-sounds mode (step S111). By verifying the picture-and-sounds mode, a sound field on which the mode is reflected is designated in the audiovisual amplifier 300 (step S112). Actions to be performed for verification at step S111 are equivalent to the actions described in the flowchart of FIG. 13. The actions to be performed at step S112 are equivalent to the actions described in FIG. 15.

Figure 20:
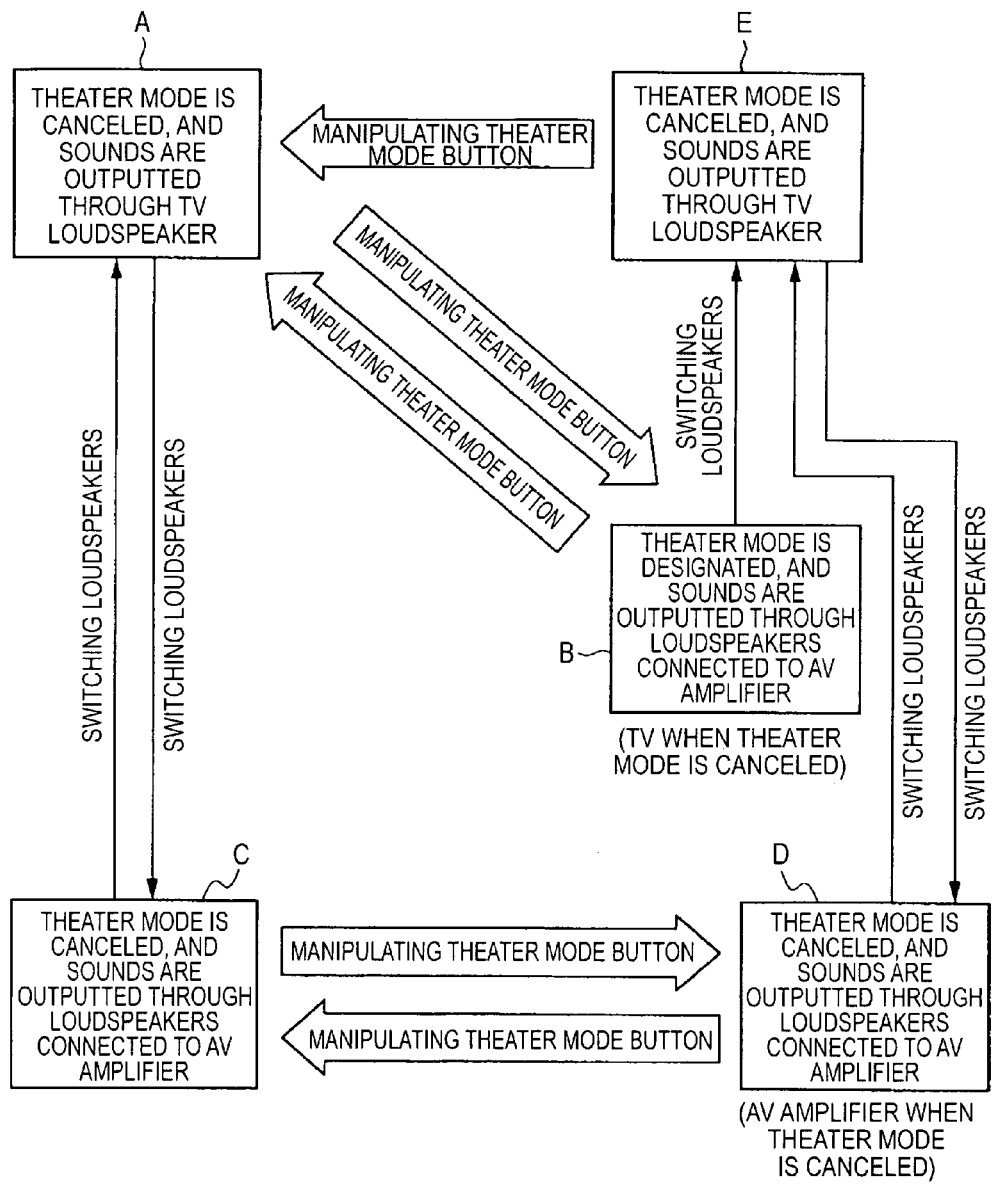
FIG. 20 is an explanatory diagram showing state transitions to be made in relation to a theater mode in the embodiment of the present invention.

A state transition diagram of FIG. 20 is a diagram showing the relationship between selection of the loudspeaker (TV loudspeaker) of the television set or the group of loudspeakers on the side of the audiovisual amplifier (audiovisual amplifier-side loudspeakers), and designation or cancelation of the theater mode. A theater-mode-button manipulation shall signify that the theater mode button 802a shown in FIG. 6 has been depressed.

Now, states will be described below.

A state A is a state in which the theater mode is canceled, and audio outputting is achieved through the loudspeaker of the television set.

A state B is a state in which the theater mode is designated, and audio outputting is achieved through the loudspeakers on the side of the audiovisual amplifier. The state B is a state attained in a case where when the theater mode is canceled, audio outputting is achieved through the loudspeaker of the television set (that is, a state into which a transition is made from the state A).

A state C is a state in which the theater mode is canceled, and audio outputting is achieved through the loudspeakers on the side of the audiovisual amplifier.

A state D is a state in which the theater mode is designated, and audio outputting is achieved through the loudspeakers on the side of the audiovisual amplifier. However, the state D is a state attained in a case where when the theater mode is canceled, audio outputting is achieved through the loudspeakers on the side of the audiovisual amplifier (that is, a state to which a transition is made from the state C).

A state E is a state in which the theater mode is designated, and audio outputting is achieved through the loudspeaker of the television set. The state E is a state attained only when the loudspeakers are changed with a user's manipulation with the theater mode designated.

The states are defined as mentioned above. In this case, when a manipulation is performed in order to designate the theater mode, a transition is, as shown in FIG. 20, made from the state A to the state B, or from the state C to the state D. When a manipulation is performed in order to cancel the theater mode, the original state is restored.

When a loudspeaker switching manipulation is performed, the states A and C are changed, or the states D and E are changed. When the loudspeaker switching manipulation is performed in the state B, the state B is changed to the state E. Further, if the theater mode is canceled in the state E, the state E is changed to the state A.

Interlocked with the designation or cancelation of the theater mode shown in FIG. 20, a sound field associated with the surround sound is designated or canceled in the audiovisual amplifier 300.

As described so far, according to the system configuration of the present embodiment, once the theater mode is designated at the television set, the audiovisual amplifier autonomously designates an appropriate sound field. Thus, the television set and audiovisual amplifier collaborate with each other. In particular, if a state attained before the theater mode is designated is a state in which audio is outputted directly through the television set, switching output loudspeakers is interlocked with the designation of the theater mode. This is advantageous because manipulations are simplified. In addition, since control is implemented using the CEC channel of the HDMI cable, when the audiovisual amplifier is not connected, the foregoing processing is not carried out. Only when the audiovisual amplifier is correctly connected to the television set, the television set and audiovisual amplifier collaborate with each other. This would prove advantageous.

Even when a sound field is designated based on genre information concerning an audiovisual content to be viewed, if the theater mode is designated, the designation based on the genre information is ignored. Therefore, a sound field associated with the theater mode selected with a user's manipulation can be designated reliably.

The names of modes including the theater mode described above in relation to the present embodiment are mere examples. The same pieces of processing may be performed in any other mode in which a sound field, sounds, and sound quality are designated. As for the network over which apparatuses are interconnected, a network conformable to the HDMI is a mere example. A network in which any other technology is implemented may be adopted.

It should be understood by those skilled in the art that various modifications, combinations, sub-combinations and alterations may occur depending on design requirements and other factors insofar as they are within the scope of the appended claims or the equivalents thereof.

What is claimed is:

1. An audio processing apparatus comprising:
   a transmission signal input/output unit that inputs or outputs a video signal, an audio signal, and a control signal;
   a reproduction processing unit that reproduces the audio signal inputted to the transmission signal input/output unit or an audio signal inputted to any other audio signal input unit;
   an output unit that outputs the audio signal, which is processed by the reproduction processing unit, through a loudspeaker; and
   a control unit that when detecting that a control signal signifying that a predetermined mode concerning the display image quality represented by the video signal should be designated is inputted to the transmission signal input/output unit, controls (i) changing to an audio reproduction mode for audio outputting for the apparatus, so that sounds represented by an audio signal from other apparatus will be outputted from the output unit and the apparatus is in a muting state in which audio output is not outputted from the apparatus, and (ii) transmission to the other apparatus of a control signal with which the sounds represented by the audio signal and outputted through a loudspeaker of the other apparatus are muted, and instructs the reproduction processing unit to perform predetermined sound-field processing or sound-quality processing during the reproduction.

2. The audio processing apparatus according to claim 1, wherein
   the predetermined mode concerning the display image quality represented by the video signal is a theater mode in which display image quality suitable for viewing of a movie is designated; and
   when the control unit detects designation of the theater mode, the control unit controls the reproduction processing unit so that the reproduction processing unit will designate a specific audio reproduction mode suitable for viewing of a movie.

3. The audio processing apparatus according to claim 2, wherein
   when a genre represented by an inputted video signal or audio signal is indicated with a control signal inputted to the transmission signal input/output unit, the control unit instructs the reproduction processing unit to designate an audio reproduction mode suitable for the indicated genre; and
   when the control unit detects the designation of the theater mode, the control unit instructs the reproduction processing unit to preferentially designate the specific audio reproduction mode rather than the reproduction mode designated with the indication of the genre.

4. The audio processing apparatus according to claim 2, wherein when the control unit detects the designation of the theater mode with a control signal inputted to the transmission signal input/output unit, the control unit transmits a control signal, with which sounds represented by an audio signal and outputted through the loudspeaker of the other apparatus are muted, to the other apparatus so that the sounds will be outputted from the output unit.

5. The audio processing apparatus according to claim 4, wherein when cancellation of the theater mode is detected, muting the sounds represented by the audio signal and outputted through the loudspeaker of the other apparatus is canceled, and outputting the sounds from the output unit is ceased.

6. An audio processing method comprising the steps of:

inputting or outputting a video signal, an audio signal, and a control signal, and performing input processing and output processing on the video signal and audio signal;

reproducing the audio signal obtained at the input/output processing step;

outputting sounds represented by the audio signal, which is processed at the reproduction processing step, through a loudspeaker; and when the fact that a control signal, which signifies that a predetermined mode concerning the display image quality represented by the video signal should be designated, is inputted at the input/output processing step is detected, changing an audio reproduction mode for audio outputting for an apparatus, so that sounds represented by an audio signal from other apparatus will be outputted from the apparatus and the apparatus is in a muting state in which audio output is not outputted from the apparatus and controlling transmission to the other apparatus of a control signal with which the sounds represented by the audio signal and outputted through a loudspeaker of the other apparatus are muted, and performing predetermined sound-field processing or sound-quality processing during reproduction at the reproduction processing step.

* * * * *